(12) United States Patent
Sendo et al.

(10) Patent No.: US 8,722,172 B2
(45) Date of Patent: May 13, 2014

(54) HONEYCOMB STRUCTURE, MANUFACTURING METHOD THEREOF, AND CATALYST CARRYING HONEYCOMB STRUCTURE

(75) Inventors: Koichi Sendo, Nagoya (JP); Hiroyuki Suenobu, Nagoya (JP); Shogo Hirose, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 55 days.

(21) Appl. No.: 13/409,351

(22) Filed: Mar. 1, 2012

(65) Prior Publication Data
US 2012/0251768 A1  Oct. 4, 2012

(30) Foreign Application Priority Data

Mar. 30, 2011  (JP) ................. 2011-075144

(51) Int. Cl.
| | |
|---|---|
| F01N 3/022 | (2006.01) |
| C04B 35/195 | (2006.01) |
| C04B 38/06 | (2006.01) |
| B01D 46/24 | (2006.01) |
| B32B 3/26 | (2006.01) |
| B01J 32/00 | (2006.01) |

(52) U.S. Cl.
USPC ............. 428/116; 428/304.4; 428/320.2; 502/439

(58) Field of Classification Search
USPC .......... 428/116–118, 305.5, 307.3, 315.7, 428/320.2; 502/439; 422/168–172, 422/177–182; 55/522–524; 60/297
See application file for complete search history.

(56) References Cited

U.S. PATENT DOCUMENTS

| | | | |
|---|---|---|---|
| 5,545,243 A * | 8/1996 | Kotani et al. .............. | 55/523 |
| 7,276,276 B2 | 10/2007 | Noguchi et al. | |
| 7,517,830 B2 * | 4/2009 | Nomura et al. ............ | 502/302 |
| 7,537,716 B2 | 5/2009 | Matsunaga et al. | |
| 7,540,898 B2 * | 6/2009 | Oshimi .................... | 55/523 |
| 7,993,740 B2 * | 8/2011 | Ohno et al. ................ | 428/116 |
| 2003/0024220 A1 * | 2/2003 | Ishihara et al. ............ | 55/523 |

(Continued)

FOREIGN PATENT DOCUMENTS

| | | |
|---|---|---|
| EP | 1298112 A1 | 4/2003 |
| EP | 1374969 A1 | 1/2004 |

(Continued)

OTHER PUBLICATIONS

Extended European Search Report, European Patent Application No. 12158379.3, dated Jul. 20, 2012 (8 pages).

(Continued)

*Primary Examiner* — David Sample
*Assistant Examiner* — Nicholas W Jordan
(74) *Attorney, Agent, or Firm* — Burr & Brown, PLLC

(57) ABSTRACT

There is disclosed a honeycomb structure onto which a large amount of catalyst can be carried while suppressing an increase in pressure drop. In a honeycomb structure comprising porous partition walls by which a plurality of cells that become through channels of a fluid are partitioned and in which a plurality of pores are formed. In each of the partition walls, pores having pore diameters larger than a thickness of the partition wall in a section thereof which is perpendicular to an extending direction of the cells are formed so as to occupy 4 to 11% of the total volume of the pores formed in the partition walls.

10 Claims, 16 Drawing Sheets

(56) References Cited

U.S. PATENT DOCUMENTS

| | | | |
|---|---|---|---|
| 2003/0166450 A1* | 9/2003 | Kumazawa et al. | 501/119 |
| 2006/0290036 A1 | 12/2006 | Kaneda et al. | |
| 2007/0039297 A1* | 2/2007 | Kawata et al. | 55/523 |
| 2007/0048494 A1 | 3/2007 | Miyairi et al. | |
| 2008/0264010 A1* | 10/2008 | Mizuno et al. | 55/350.1 |
| 2008/0317999 A1 | 12/2008 | Patchett et al. | |
| 2010/0205921 A1* | 8/2010 | Okazaki et al. | 55/523 |
| 2011/0036080 A1* | 2/2011 | Beall et al. | 60/299 |
| 2012/0064286 A1* | 3/2012 | Hirose et al. | 428/116 |

FOREIGN PATENT DOCUMENTS

| | | |
|---|---|---|
| EP | 2425888 A1 | 3/2012 |
| JP | 4246475 B2 | 4/2009 |
| JP | 2009-242133 A1 | 10/2009 |
| JP | 2010-516466 A1 | 5/2010 |
| JP | 4540094 B2 | 9/2010 |
| WO | 2009/145910 A1 | 12/2009 |

OTHER PUBLICATIONS

Japanese Office Action dated Apr. 23, 2013.

* cited by examiner

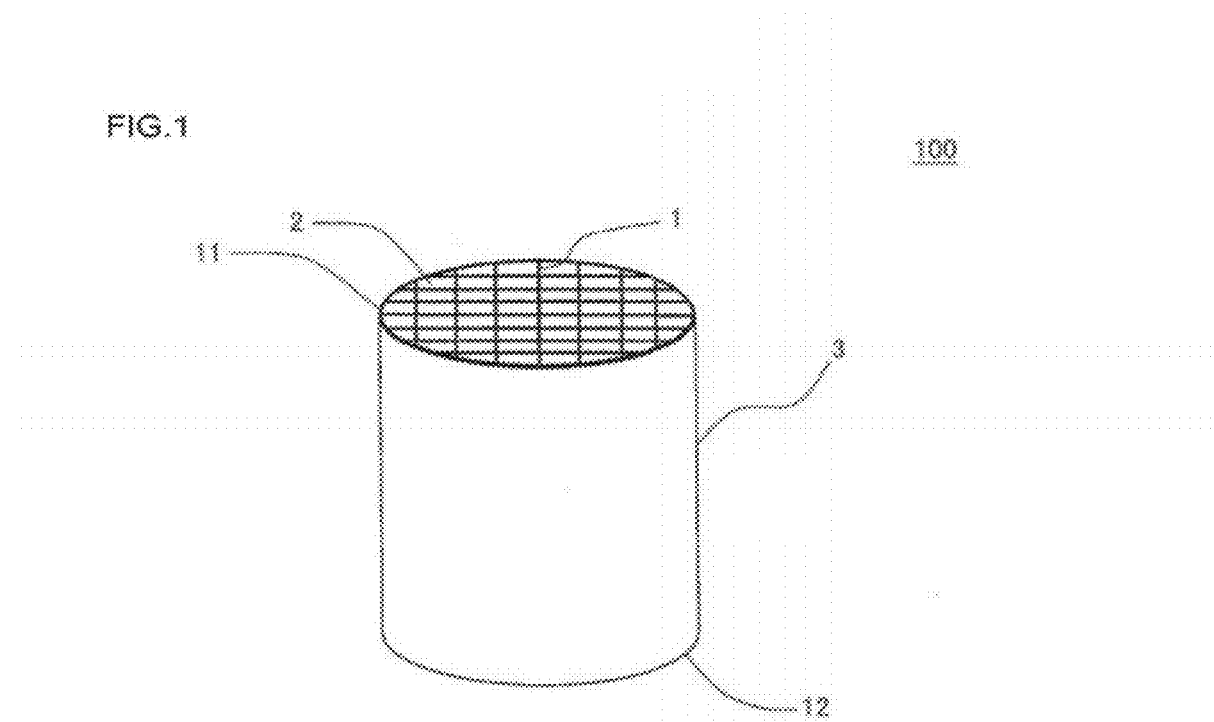
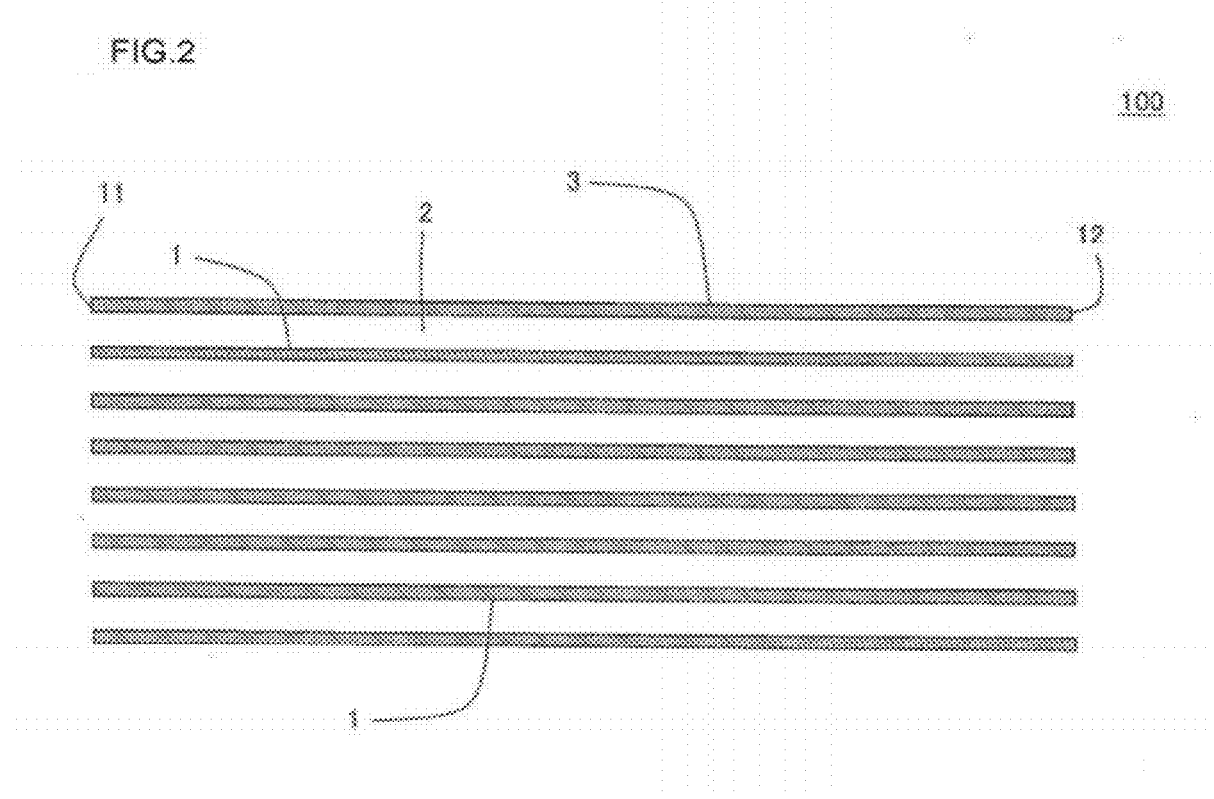

HONEYCOMB STRUCTURE, MANUFACTURING METHOD THEREOF, AND CATALYST CARRYING HONEYCOMB STRUCTURE

BACKGROUND OF THE INVENTION

1. Field of the Invention

The present invention relates to a honeycomb structure and a manufacturing method thereof. More particularly, it relates to a honeycomb structure onto which a large amount of catalyst can be carried while suppressing an increase in pressure drop and which can suitably be used as a catalyst carrier, and a honeycomb structure manufacturing method by which such a honeycomb structure can be manufactured.

2. Description of the Related Art

Heretofore, there have been suggested exhaust gas purification devices where a catalyst for purification is carried onto a catalyst carrier, to purify components under purification included in exhaust gases discharged from engines for a car and for a construction machine, an industrial stationary engine, a combustion apparatus, and the like. Examples of the components under purification include carbon monoxides (CO), hydrocarbons (HC), nitrogen oxides ($NO_x$), and sulfur oxides ($SO_x$). As a catalyst carrier for such an exhaust gas purification device, there is used, for example, a honeycomb structure including porous partition walls by which a plurality of cells that become through channels of a fluid are partitioned (e.g., Patent Documents 1 and 2). The catalyst for purification is carried onto the surfaces of the partition walls of the honeycomb structure and the insides of pores of the porous partition walls.

The honeycomb structure can be manufactured by, for example, the following manufacturing method. First, forming raw materials containing a ceramic raw material are mixed and kneaded to obtain a kneaded clay. The obtained kneaded clay is extruded and formed into a honeycomb shape to obtain a honeycomb formed article. The obtained honeycomb formed article is dried and fired, whereby the honeycomb structure can be manufactured. Moreover, as a manufacturing method of a porous ceramic having a high porosity and a large strength, the following manufacturing method and the like have been disclosed. The manufacturing method includes a step of forming a mixture containing water absorptive polymer particles having an amount of water to be absorbed at a pressure of 980 Pa in a range of 5 to 30 ml/g, the ceramic raw material and water, and a step of heating and firing the obtained formed article (e.g., Patent Document 3).

[Patent Document 1] JP-A-2009-242133
[Patent Document 2] Japanese Patent No. 4246475
[Patent Document 3] Japanese Patent No. 4540094

In honeycomb structures disclosed in Patent Documents 1 and 2, however, when an amount of a catalyst to be carried becomes large, a large amount of catalyst is deposited on the surfaces of partition walls. In consequence, there have been problems that sectional areas of cells which become through channels of a fluid decrease and that a pressure drop increases.

Moreover, in a manufacturing method disclosed in Patent Document 3, it has been suggested that as water absorptive polymer particles contained in a forming mixture, particles having an average particle diameter in a range of 1/30 to 1/1 on the basis of a thickness of a ceramic formed article are used. However, even when such water absorptive polymer particles are used, the amount of the catalyst to be carried onto the obtained honeycomb structure is limited. In consequence, there has been demanded the development of a honeycomb structure onto which a larger amount of the catalyst can be carried and in which an increase in pressure drop does not easily occur.

SUMMARY OF THE INVENTION

The present invention has been developed in view of the above-mentioned problems, and there is provided a honeycomb structure onto which a large amount of catalyst can be carried while suppressing an increase in pressure drop and which can suitably be used as a catalyst carrier. Moreover, there is provided a manufacturing method of a honeycomb structure by which the above honeycomb structure can be manufactured. Furthermore, there is provided a catalyst carrying honeycomb structure which uses the above honeycomb structure.

According to the present invention, there are provided a honeycomb structure, a manufacturing method thereof, and a catalyst carrying honeycomb structure.

According to a first aspect of the present invention, a honeycomb structure is provided, comprising porous partition walls by which a plurality of cells that become through channels of a fluid are partitioned and in which a plurality of pores are formed, wherein in each of the partition walls, pores having pore diameters larger than a thickness of the partition wall, in a section thereof taken perpendicular to an extending direction of the cells, are formed so as to occupy 4 to 11% of the total volume of the pores formed in the partition wall (hereinafter referred to as "the first invention").

According to a second aspect of the present invention, a honeycomb structure is provided, comprising porous partition walls by which a plurality of cells that become through channels of a fluid are partitioned and in which a plurality of pores are formed, wherein in sections of the partition walls cut perpendicular to an extending direction of the cells, a ratio of the sum of areas of inscribed circles having diameters of 90 µm or larger among inscribed circles drawn in the pores in the sections, with respect to the total area of all the pores in the sections, is from 10 to 50% (hereinafter also referred to as "the second invention").

According to a third aspect of the present invention, a honeycomb structure is provided, comprising porous partition walls by which a plurality of cells that become through channels of a fluid are partitioned and in which a plurality of pores are formed, wherein in the surface of each of the partition walls, a ratio of the sum of areas of inscribed circles having diameters of 60 µm or larger among inscribed circles drawn in open frontal areas of pores opened in the surface of the partition wall, with respect to an area of the surface of the partition wall, is from 2 to 10% (hereinafter also referred to as "the third invention").

According to first aspect of the present invention, the honeycomb structure according to any one of the above first to third aspects is provided, wherein the partition walls are made of a ceramic containing material, and the partition walls have a porosity of 40 to 70% and an average pore diameter of 10 to 70 µm.

According to a firth aspect of the present invention, the honeycomb structure according to any one of the above first to fourth aspects is provided, wherein the partition walls are made of a material containing at least one type of ceramic selected from the group consisting of cordierite, silicon carbide, aluminum titanate, and mullite.

According to a sixth aspect of the present invention, the honeycomb structure according to any one of the above first to fifth aspects is provided, wherein the partition walls have a thickness of 50 to 350 µm, and a cell density of 15.5 to 155 cells/cm$^2$.

According to a seventh aspect of the present invention, the catalyst carrying honeycomb structure comprising the honeycomb structure according to any one of the above first to sixth aspects is provided, and a catalyst charged into the pores of the partition walls of the honeycomb structure, wherein a ratio of volumes of the pores into which the catalyst has been charged, with respect to the total volume of the pores of the partition walls, is from 70 to 100% (hereinafter also referred to as "the fourth invention").

According to an eighth aspect of the present invention, a manufacturing method of a honeycomb structure is provided, comprising: a kneaded clay preparing step of mixing and kneading forming raw materials containing a ceramic raw material to obtain a kneaded clay; a forming step of extruding and forming the obtained kneaded clay into a honeycomb shape to obtain a honeycomb formed article; and a firing step of drying and firing the obtained honeycomb formed article to obtain the honeycomb structure including porous partition walls by which a plurality of cells that become through channels of a fluid are partitioned, wherein in the kneaded clay preparing step, a pore former having an average particle diameter larger than a thickness of each of the partition walls of the obtained honeycomb structure is added to the ceramic raw material to prepare the kneaded clay (hereinafter also referred to as "the fifth invention").

According to a ninth aspect, the manufacturing method of the honeycomb structure according to the above eighth aspect is provided, wherein the pore former is a water absorptive polymer, and the average particle diameter of the water absorptive polymer in a water saturation state is larger than the thickness of each of the partition walls.

According to a tenth aspect, a manufacturing method of a honeycomb structure is provided, comprising: a kneaded clay preparing step of mixing and kneading forming raw materials containing a ceramic raw material to obtain a kneaded clay; a forming step of extruding and forming the obtained kneaded clay into a honeycomb shape to obtain a honeycomb formed article; and a firing step of drying and firing the obtained honeycomb formed article to obtain the honeycomb structure including porous partition walls by which a plurality of cells that become through channels of a fluid are partitioned, wherein in the kneaded clay preparing step, a pore former having an average particle diameter which is smaller than a thickness of each of the partition walls of the obtained honeycomb structure and becomes larger than the thickness of the partition wall owing to thermal expansion is added to the ceramic raw material to prepare the kneaded clay (hereinafter also referred to as "the sixth invention").

A honeycomb structure of the present invention (the first invention) comprises porous partition walls in which a plurality of pores are formed. By the above partition walls, a plurality of cells that become through channels of a fluid are partitioned. In each of the partition walls, pores having pore diameters larger than a thickness of the partition wall, in a section thereof cut which is perpendicular to an extending direction of the cells, are formed so as to occupy 4 to 11% of the total volume of the pores formed in the partition wall. In consequence, a large amount of catalyst can be carried in "the pores having pore diameters larger than the thickness of the partition wall". In the honeycomb structure of the present invention, the amount of the catalyst to be carried (deposited) on the surfaces of the partition walls can relatively be decreased as compared with a conventional catalyst carrier. Therefore, when the honeycomb structure is used as the catalyst carrier, an increase in pressure drop of the honeycomb structure can be suppressed. Moreover, "the pores having pore diameters larger than the thickness of the partition wall" have a volume ratio of 4 to 11%. Therefore, even when the catalyst is, for example, an SCR catalyst for NO$_x$ selective reduction which requires a comparatively large amount of catalyst to be carried, it is possible to suitably carry a sufficient amount of catalyst for performing purification of a component under purification.

Moreover, a honeycomb structure of the present invention (the second invention) comprises porous partition walls in which a plurality of pores are formed. By the above partition walls, a plurality of cells that become through channels of a fluid are partitioned. In the second invention, in sections of the partition walls cut perpendicular to an extending direction of the cells, a ratio of the sum of areas of inscribed circles having diameters of 90 µm or larger among inscribed circles drawn in the pores in the sections, with respect to the total area of all the pores in the sections, is from 10 to 50%. In consequence, a large amount of catalyst can be carried in "the pores in which the inscribed circles having the diameters of 90 µm or larger are drawn". The "total area of all the pores in the sections" is the total area of void portions in the sections. In the honeycomb structure of the present invention, the amount of the catalyst to be carried onto (deposited on) the surfaces of the partition walls can relatively be decreased as compared with the conventional catalyst carrier. Therefore, when the honeycomb is used as the catalyst carrier, the increase in pressure drop of the honeycomb structure can be suppressed. Moreover, since the ratio of the sum of the areas of the inscribed circles having the diameters of 90 µm or larger is from 10 to 50%, a large number of "pores in which the inscribed circles having the diameters of 90 µm or larger are drawn" are present in the partition walls. Therefore, even when the catalyst is, for example, the SCR catalyst for NO$_x$ selective reduction which requires a comparatively large amount of catalyst to be carried, or the like, it is possible to suitably carry the sufficient amount of catalyst for performing the purification of the component under purification.

Moreover, a honeycomb structure of the present invention (the third invention) comprises porous partition walls in which a plurality of pores are formed. By the above partition walls, a plurality of cells that become through channels of a fluid are partitioned. In the third invention, in the surface of each of the partition walls, a ratio of the sum of areas of inscribed circles having diameters of 60 µm or larger among inscribed circles drawn in open frontal areas of pores opened in the surface of the partition wall, with respect to an area of the surface of the partition wall, is from 2 to 10%. In consequence, a large amount of catalyst can be introduced into the pores through "the pores in which the inscribed circles having diameters of 60 µm or larger are drawn", and a larger amount of catalyst can be carried onto the insides of the partition walls (in the pores). The area of the surface of the partition wall is the total area including the pores opened in the surface of the partition wall. In the honeycomb structure of the present invention, the amount of the catalyst to be carried onto (deposited on) the surfaces of the partition walls can relatively be decreased as compared with the conventional catalyst carrier. Therefore, when the honeycomb structure is used as the catalyst carrier, the increase in pressure drop of the honeycomb structure can be suppressed. Moreover, since the ratio of the sum of the areas of the inscribed circles having the diameters of 60 µm or larger is from 2 to 10%, a large number of "the pores in which the inscribed circles having the diameters of 60 µm or larger are drawn" are present in the surfaces of the partition walls. Therefore, even when the catalyst is, for example, the SCR catalyst for $NO_x$ selective reduction which requires a comparatively large amount of catalyst to be carried, or the like, it is possible to introduce, into the pores, the sufficient amount of catalyst for performing the purification of the component under purification.

Furthermore, a catalyst carrying honeycomb structure of the present invention (the fourth invention) comprises the honeycomb structure according to any one of the first to third inventions, and a catalyst charged into the pores of the partition walls of the honeycomb structure. Moreover, in this catalyst carrying honeycomb structure, a ratio of volumes of the pores into which the catalyst has been charged, with respect to the total volume of the pores of the partition walls, is from 70 to 100%. As described above, the honeycomb structures of the above first to third inventions have remarkably large volumes of the pores through which the catalyst can be carried onto the insides of the partition walls as compared with the conventional honeycomb structure. In the catalyst carrying honeycomb structure of the present invention, a large amount of catalyst is charged into the pores of the partition walls, and the component under purification can remarkably suitably be purified.

Additionally, a manufacturing method of a honeycomb structure of the present invention (the fifth invention) comprises a kneaded clay preparing step, a forming step and a firing step. The kneaded clay preparing step is a step of mixing and kneading forming raw materials containing a ceramic raw material to obtain a kneaded clay. The forming step is a step of forming the obtained kneaded clay into a honeycomb shape to obtain a honeycomb formed article. The firing step is a step of drying and firing the obtained honeycomb formed article to obtain the honeycomb structure including porous partition walls by which a plurality of cells that become through channels of a fluid are partitioned. In the fifth invention, in the above kneaded clay preparing step, a pore former having an average particle diameter larger than a thickness of each of the partition walls of the obtained honeycomb structure is added to the ceramic raw material to prepare the kneaded clay. Consequently, in the partition walls of the honeycomb structure, it is possible to form remarkably large pores as compared with the conventional honeycomb structure. The remarkably large pores have diameters larger than the thickness of each partition wall.

"The pore former having an average particle diameter larger than the thickness of the partition walls" has not been used in a conventional manufacturing method of the honeycomb structure. For example, a reason for this non-use is that slits of a die are clogged with the pore former during the extrusion-forming. After repeating various investigations, the following finding has been obtained this time. It has been found that the honeycomb structure of the present invention (the first to third inventions) can be obtained by the manufacturing method of the honeycomb structure of the present invention, and the present invention has been completed. That is, the pore former in the kneaded clay is deformed by a pressing pressure during the extrusion-forming. Therefore, even "the pore former having an average particle diameter larger than the thickness of the partition wall" can pass through the slits of the die.

Moreover, a manufacturing method of the honeycomb structure of the present invention (the sixth invention) comprises a kneaded clay preparing step, a forming step, and a firing step. The kneaded clay preparing step is a step of adding, to a ceramic raw material, a pore former having an average particle diameter which is smaller than a thickness of each of partition walls of an obtained honeycomb structure and becomes larger than the thickness of the partition wall owing to thermal expansion, to prepare a kneaded clay. Consequently, in the partition wall of the honeycomb structure, it is possible to form remarkably large pores as compared with the conventional honeycomb structure. That is, in the manufacturing method of the honeycomb structure of the sixth invention, there is used, during the extrusion-forming, the pore former which is smaller than a width of each slit corresponding to the thickness of each partition wall and which thermally expands to be larger than the thickness of the partition wall when heated. It has been found that the honeycomb structure of the present invention (the first to third inventions) can be obtained by using the above pore former, and the present invention has been completed.

BRIEF DESCRIPTION OF THE DRAWINGS

FIG. 1 is a perspective view schematically showing an embodiment of a honeycomb structure of the present invention (the first invention);

FIG. 2 is an exemplary diagram showing a section of the embodiment of the honeycomb structure of the present invention (the first invention) which is parallel to a cell extending direction;

DETAILED DESCRIPTION OF THE INVENTION

Hereinafter, embodiments of the present invention will specifically be described with reference to the drawings. It should be understood that the present invention is not limited to the following embodiments and that the following embodiments to which modifications, improvements and the like are appropriately added on the basis of the knowledge of a person skilled in the art without departing from the scope of the present invention fall in the scope of the present invention.

Figure 3:
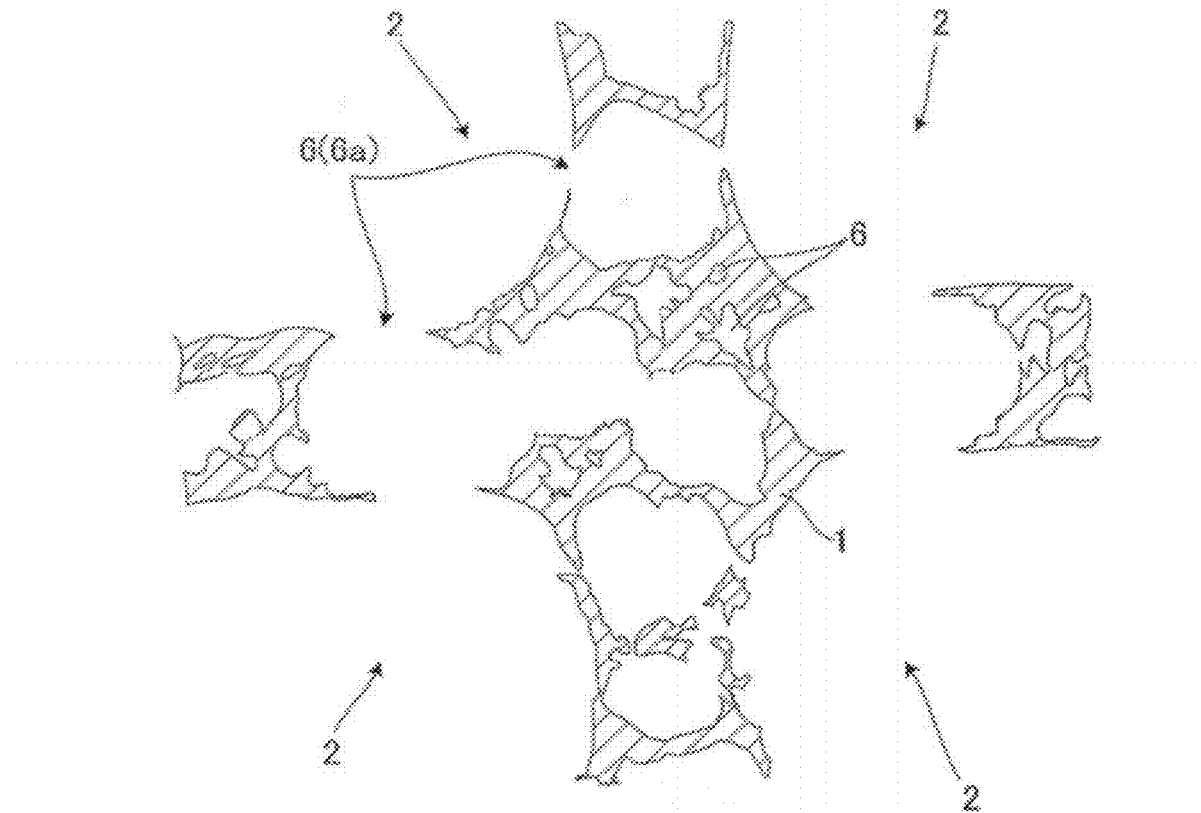
FIG. 3 is an exemplary diagram showing an enlarged section of the embodiment of the honeycomb structure of the present invention (the first invention) which is cut perpendicular to the cell extending direction.

(1) Honeycomb Structure (the First Invention):

An embodiment of a honeycomb structure of the present invention (the first invention) will be described. As shown in FIG. 1 to FIG. 3, a honeycomb structure 100 of the present embodiment includes porous partition walls 1. In the porous partition walls 1, a plurality of pores 6 are formed. By the porous partition walls 1, a plurality of cells 2 that become through channels of a fluid are partitioned. In each of the porous partition walls 1, pores 6a having pore diameters larger than a thickness of the partition wall 1 in a section thereof which is perpendicular to an extending direction of the cells 2 are formed so as to occupy 4 to 11% of the total volume of the pores 6 formed in the partition wall 1. Hereinafter, the thickness of the partition wall 1 will also be referred to as "the partition wall thickness" or "the rib thickness". Hereinafter, a ratio (%) of "volumes of the pores 6a having pore diameters larger than the thickness of the partition wall 1", with respect to "the total volume of the pores 6", will be referred to as "the volume ratio (%) of the pores 6a having pore diameters larger than the thickness of the partition wall 1" or simply as "the volume ratio (%)" sometimes.

Here, FIG. 1 is a perspective view schematically showing the embodiment of the honeycomb structure of the present invention (the first invention). FIG. 2 is an exemplary diagram showing a section of the embodiment of the honeycomb structure of the present invention (the first invention) which is parallel to a cell extending direction. FIG. 3 is an exemplary diagram showing an enlarged section of the embodiment of the honeycomb structure of the present invention (the first invention) which is perpendicular to the cell extending direction. The honeycomb structure 100 of the present embodiment is a cylindrical honeycomb structure including the porous partition walls 1 and an outer peripheral wall 3 positioned in an outermost periphery thereof. By the porous partition walls 1, the plurality of cells 2 extending from one end surface 11 to another end surface 12 are partitioned.

When the honeycomb structure 100 of the present embodiment is used as a catalyst carrier, a large amount of catalyst can be carried in "the pores 6a having pore diameters larger than the thickness of the partition wall 1". Therefore, as compared with a honeycomb structure which is used as a conventional catalyst carrier, the amount of the catalyst to be carried onto the surfaces of the partition walls 1 can relatively be decreased. In consequence, an increase in pressure drop of the honeycomb structure 100 can be suppressed. The catalyst carried onto the surfaces of the partition walls 1 is a catalyst deposited on the surfaces of the partition walls 1. Moreover, the volume ratio of "the pores 6a having pore diameters larger than the thickness of the partition wall 1" is from 4 to 11%. Therefore, even when the catalyst is, for example, an SCR catalyst or the like which requires a comparatively large amount of catalyst to be carried, it is possible to suitably carry the sufficient amount of catalyst for performing purification of a component under purification. The SCR stands for "selective catalytic reduction". Examples of the SCR catalyst include an SCR catalyst for $NO_x$ selective reduction.

If "the volume ratio of the pores 6a having pore diameters larger than the thickness of the partition wall 1" is smaller than 4%, the number of the large pores 6a where a large amount of catalyst can be carried is excessively small. Therefore, the amount of the catalyst which can be carried in the pores 6a cannot sufficiently be acquired. In consequence, when a large amount of catalyst is carried onto the honeycomb structure 100, the amount of the catalyst to be carried onto the surfaces of the partition walls 1 have to be increased in the same manner as in the conventional honeycomb structure. As a consequence, the pressure drop of the honeycomb structure 100 increases. Moreover, if "the volume ratio of the pores 6a having pore diameters larger than the thickness of the partition wall 1" exceeds 11%, a strength of the honeycomb structure 100 lowers, and the honeycomb structure 100 is easily damaged. Examples of the strength of the honeycomb structure 100 include an isostatic strength.

In the honeycomb structure of the present embodiment, "the pores 6a having pore diameters larger than the thickness of the partition wall 1" are formed. Therefore, the strength of the honeycomb structure itself lowers sometimes, but a larger amount of catalyst can be carried in the pores of the partition walls as compared with the conventional honeycomb structure. In consequence, the strength of the honeycomb structure can be enhanced as compared with the conventional honeycomb structure having about the same pressure drop. That is, when the catalyst is actually carried onto the honeycomb structure and the structure is used as a catalyst carrying member, a higher strength can be realized as compared with the conventional honeycomb structure. The conventional honeycomb structure having about the same pressure drop is a honeycomb structure including small pores. The honeycomb structure which is used as the catalyst carrying member will hereinafter be referred to as "the catalyst carrying honeycomb structure".

"The thickness of the partition wall" means the thickness of the wall (the partition wall) which partitions two adjacent cells 2 in the section of the honeycomb structure 100 cut perpendicular to the extending direction of the cells 2. "The thickness of the partition wall" can be measured by, for example, an image analysis device (trade name "NEXIV, VMR-1515" manufactured by Nikon Corporation).

"The pores" are voids formed in the porous partition walls 1. The pores 6 are also referred to as fine pore. In the honeycomb structure 100 of the present embodiment, "the pores 6a having pore diameters larger than the thickness of the partition wall 1" among the pores 6 formed in the partition walls 1 are formed so as to occupy 4 to 11% of the total volume of the pores 6 formed in the partition walls 1.

"The pores 6a having pore diameters larger than the thickness of the partition wall 1" are the pores 6a having pore diameters which are measured by mercury porosimetry and become larger than the thickness of the partition wall 1 constituting the honeycomb structure 100. More specifically, the following pores 6a are "the pores 6a having pore diameters larger than the thickness of the partition wall 1". First, a pore distribution of the pores 6 formed in the partition wall 1 is measured. In this pore distribution, the pores 6 having pore diameters larger than the thickness of the partition wall 1 of the honeycomb structure 100 are "the pores 6a having pore diameters larger than the thickness of the partition wall 1". The pore distribution can be measured with a mercury porosimeter. Examples of the meter include a meter having a trade name: Autopore 9500 and manufactured by Micromeritics Instrument Corporation. Hereinafter, "the pores 6a having pore diameters larger than the thickness of the partition wall 1" are also referred to as "the large pores 6a" sometimes. The pore distribution of the pores is also referred to as the fine pore distribution of the pores.

A volume of each of the pores formed in the partition walls and the volume of each large pore can be measured with the mercury porosimeter. Moreover, an average pore diameter of the pores can be measured with the mercury porosimeter. A ratio of the volumes of the pores is also referred to as "the porosity". The average pore diameter of the pores is also referred to as "the average fine pore diameter".

"The volume ratio of the large pores 6a" is obtained by dividing "a value V1 of the volumes of the large pores" by "a value V2 of the total volume of the pores formed in the partition walls" and multiplying the resultant value by 100. The volume ratio of the large pores 6a is a value (V1/V2×100) of the above ratio represented by a percentage. The total volume of the pores is the sum of the volumes of all the pores formed in the partition walls. "The value V1 of the volumes of the large pores" and "the value V2 of the total volume of the pores formed in the partition walls" can be obtained from the pore distribution measured with the mercury porosimeter. For example, "the value V1 of the volumes of the large pores" is the volume of the pores having pore diameters which are not smaller than the thickness of the partition wall of the honeycomb structure in the above pore distribution. It is to be noted that "the volume ratio of the large pores" can be obtained as a ratio of a range of the pore diameters of the large pores which are not smaller than the thickness of the partition wall of the honeycomb structure, occupied in the whole pore distribution.

The volume ratio of the large pores is preferably from 4 to 11%, further preferably from 4 to 9%, and especially preferably from 4 to 6%. When the volume ratio is in the above range, the honeycomb structure having a high strength can be obtained while acquiring the sufficient amount of the catalyst to be carried.

In the honeycomb structure of the present embodiment, the partition walls are preferably made of a ceramic containing material. In the partition walls made of such a ceramic containing material, even when the large pores are formed, the high strength is realized. Furthermore, the partition walls are excellent in heat resistance and the like. It is to be noted that the partition walls are further preferably made of a material containing at least one type of ceramic selected from the group consisting of cordierite, silicon carbide, aluminum titanate, and mullite, because the material is excellent in strength and heat resistance.

The porosity of each partition wall is preferably from 40 to 70%, further preferably from 40 to 60%, and especially preferably from 50 to 60%. If the porosity is smaller than 40%, an initial pressure drop of the honeycomb structure becomes high sometimes. If the porosity is larger than 70%, the strength of the honeycomb structure lowers sometimes.

The average pore diameter of the pores formed in the partition walls is preferably from 10 to 70 µm, further preferably from 10 to 50 µm, and especially preferably from 10 to 30 µm. If the average pore diameter is smaller than 10 µm, the catalyst does not easily enter the pores. Therefore, it becomes difficult to carry the catalyst in the pores of the partition walls. Moreover, the initial pressure drop of the honeycomb structure becomes high sometimes. If the average pore diameter is larger than 70 µm, the strength of the honeycomb structure lowers sometimes.

In the honeycomb structure of the present embodiment, the partition walls are preferably made of the ceramic containing material, and preferably have a porosity of 40 to 70% and an average pore diameter of 10 to 70 µm. Such a honeycomb structure is excellent in balance between a pressure drop aspect and a strength aspect. Therefore, even on severe use conditions for the purification of an exhaust gas discharged from an internal combustion engine or the like, the honeycomb structure can suitably be used as a catalyst carrier.

The thickness of each partition wall is preferably from 50 to 350 µm, further preferably from 100 to 300 µm, and especially preferably from 100 to 250 µm. If the thickness is smaller than 50 µm, the strength of the honeycomb structure lowers sometimes. If the thickness of the partition wall is larger than 350 µm, the thickness of the partition wall is excessively large, and the pressure drop becomes high sometimes.

There is not any special restriction on a shape of the honeycomb structure 100 of the present embodiment. The shape of the honeycomb structure is preferably a cylindrical shape, a tubular shape including elliptic end surfaces, a columnar shape including polygonal end surfaces, or the like. Examples of the polygonal shape include a square shape, a rectangular shape, a triangular shape, a pentangular shape, a hexagonal shape, and an octagonal shape. The shape of the honeycomb structure 100 shown in FIG. 1 and FIG. 2 is the cylindrical shape. Moreover, the honeycomb structure 100 shown in FIG. 1 and FIG. 2 has the outer peripheral wall 3, but does not have to have the outer peripheral wall 3. The outer peripheral wall 3 may be formed together with the partition walls 1 during the extrusion-forming of a honeycomb formed article, when the honeycomb structure is prepared. Moreover, the outer peripheral wall does not have to be formed during the extrusion-forming. For example, the outer peripheral wall 3 can be formed by coating the outer periphery of the honeycomb structure with a ceramic material.

In the honeycomb structure 100 of the present embodiment, there is not any special restriction on a cell shape. Examples of the cell shape include a triangular shape, a quadrangular shape, a hexagonal shape, an octagonal shape, a round shape, and a combination thereof. As to the quadrangular shape, a square shape or a rectangular shape is preferable. The cell shape is a shape of the cells in a section of the honeycomb structure which is orthogonal to a center axis direction thereof. The center axis direction of the honeycomb structure is a cell extending direction.

The honeycomb structure of the present embodiment can be manufactured by adding, for example, a pore former having an average particle diameter larger than the thickness of each partition wall to a raw material for manufacturing the honeycomb structure. Specifically, the pore former having an average particle diameter larger than the thickness of the partition wall is first added to the raw material for manufacturing the honeycomb structure. Next, a kneaded clay is prepared from the raw material to which the above pore former has been added. Next, the obtained kneaded clay is extruded to form the honeycomb formed article. Next, the obtained honeycomb formed article is fired. Through this firing, the large pores are formed in the partition walls by the pore former.

The pore former is preferably deformed or contracted by a pressure during the extrusion-forming, and preferably passes through slits of a die for extrusion-forming. Examples of the pore former include a water absorptive polymer and a starch. Moreover, the pore former may expand to form the large pores during the firing of the honeycomb formed article.

An amount of the pore former to be added can appropriately be selected in consideration of the porosity of the partition wall, the volume ratio of the large pores, the average pore diameter, and the like. Moreover, a particle size distribution of the pore former also has an influence on the volume ratio of the large pores, and hence the particle size distribution of the pore former and the amount of the pore former to be added are preferably adjusted to prepare the kneaded clay.

Moreover, there is not any special restriction on the average particle diameter of the pore former, as long as the average particle diameter thereof is larger than the thickness of the partition wall of the obtained honeycomb structure. For example, the average particle diameter of the pore former is preferably from once to twice as much as the thickness of the partition wall. Furthermore, the average particle diameter of the pore former is further preferably from 1.2 to 1.8 times, and especially preferably from 1.2 to 1.5 times as much as the thickness of the partition wall. If the average particle diameter of the pore former is smaller than the thickness of the partition wall, the pores having pore diameters larger than the thickness of the partition wall are not actually easily formed. In consequence, the volume ratio of the large pores lowers. On the other hand, if the average particle diameter of the pore former exceeds twice as much as the thickness of the partition wall, the slits of the die for extrusion-forming are clogged with the pore former sometimes.

There will be described an example where a honeycomb structure having a partition wall thickness of 100 to 250 µm and a large pore volume ratio of 4 to 11% is manufactured. When the honeycomb structure having the above constitution is manufactured, the amount of the pore former to be added is preferably from 1.0 to 8.0 parts by mass, with respect to 100 parts by mass of a main raw material for preparing the forming kneaded clay. The average particle diameter of the pore former is preferably from 1.2 to 1.5 times as much as the thickness of the partition wall. Examples of the main raw material for preparing the forming kneaded clay include the ceramic raw material.

Figure 4:
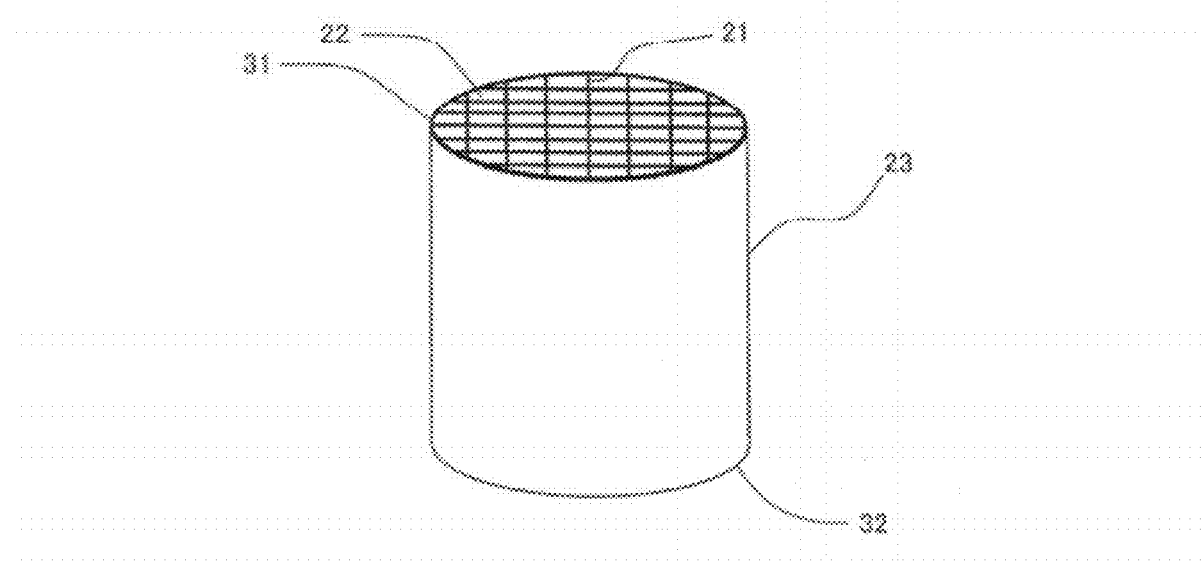
FIG. 4 is a perspective view schematically showing an embodiment of a honeycomb structure of the present invention (the second invention)
Figure 5:
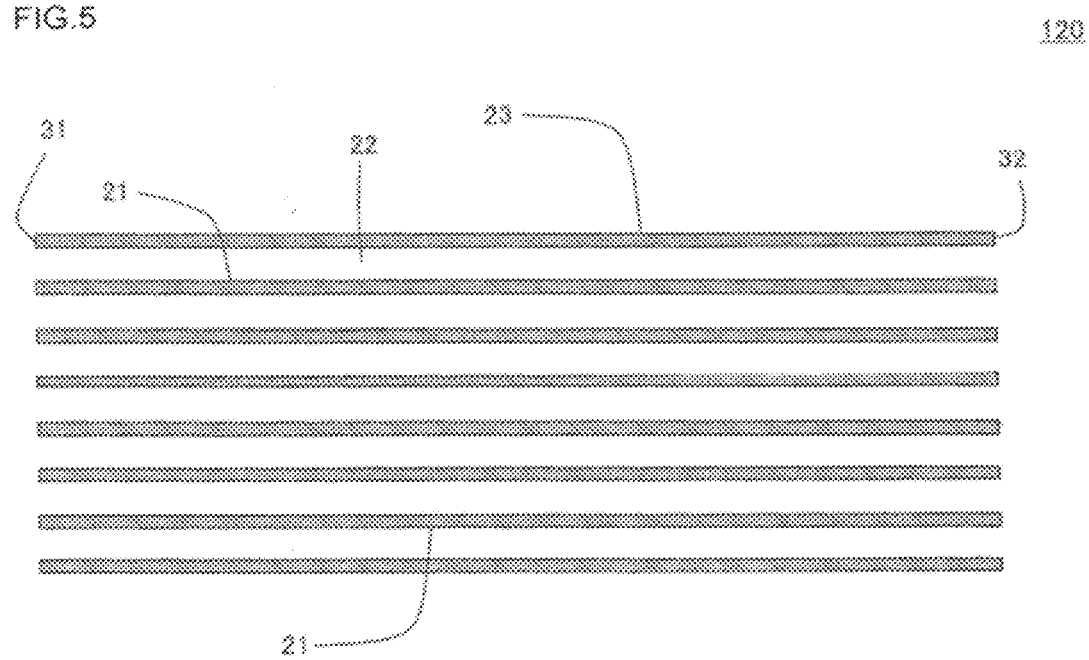
FIG. 5 is an exemplary diagram showing a section of the embodiment of the honeycomb structure of the present invention (the second invention) which is cut parallel to a cell extending direction.
Figure 6:
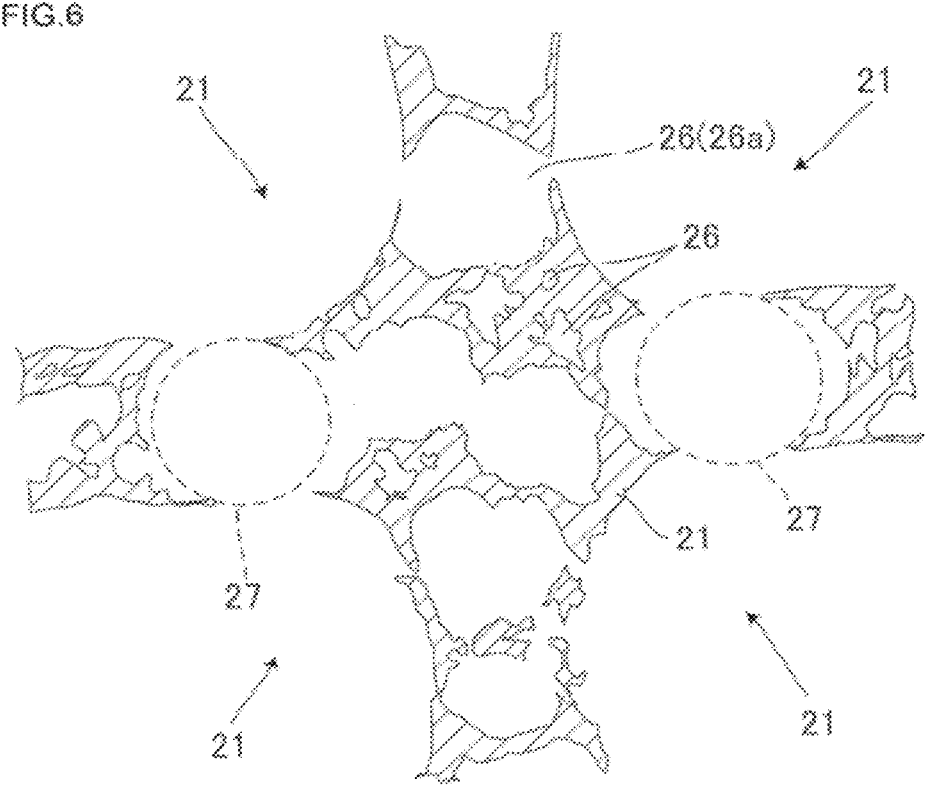
FIG. 6 is an exemplary diagram showing an enlarged section of the embodiment of the honeycomb structure of the present invention (the second invention) which is perpendicular to the cell extending direction.

(2) Honeycomb Structure (the Second Invention):

An embodiment of a honeycomb structure of the present invention (the second invention) will be described. As shown in FIG. 4 to FIG. 6, a honeycomb structure 120 of the present embodiment includes porous partition walls 21 in which a plurality of pores 26 are formed. By the porous partition walls 21, a plurality of cells 22 that become through channels of a fluid are partitioned. The honeycomb structure 120 of the present embodiment satisfies the following constitution in sections of the partition walls 21 cut perpendicular to an extending direction of the cells 22. A ratio of a sum S2 of areas of inscribed circles having diameters of 90 µm or larger among inscribed circles drawn in the pores 26 in the above sections, with respect to a total area S1 of all the pores 26 in the sections, is from 10 to 50%. The ratio is a value represented by a percentage indicated by S2/S1×100. That is, in the honeycomb structure 120 of the present embodiment, pores 26a in which inscribed circles 27 having diameters of 90 μm or larger are drawn are present among the plurality of pores 26 in the sections. Moreover, the pores 26a in which the inscribed circles having the diameters of 90 μm or larger are drawn are formed so that the total area of the inscribed circles having the diameters of 90 μm or larger is from 10 to 50% of the total area of the pores 26 in the sections.

Here, FIG. 4 is a perspective view schematically showing the embodiment of the honeycomb structure of the present invention (the second invention). FIG. 5 is an exemplary diagram showing a section of the embodiment of the honeycomb structure of the present invention (the second invention) which is parallel to a cell extending direction. FIG. 6 is an exemplary diagram showing an enlarged section of the embodiment of the honeycomb structure of the present invention (the second invention) which is perpendicular to the cell extending direction. It is to be noted that the honeycomb structure 120 shown in FIG. 4 and FIG. 5 is a tubular honeycomb structure including the porous partition walls 21 and an outer peripheral wall 23 positioned in the outermost periphery thereof. By the porous partition walls 21, the plurality of cells 22 extending from one end surface 31 to another end surface 32 are partitioned.

When the honeycomb structure 120 of the present embodiment is used as a catalyst carrier, a large amount of catalyst can be carried in "the pores 26a in which the inscribed circles having the diameters of 90 μm or larger are drawn". In consequence, an amount of the catalyst to be carried onto the surfaces of the partition walls 21 can relatively be decreased as compared with a honeycomb structure which is used as a conventional catalyst carrier. Therefore, an increase inn pressure drop of the honeycomb structure 120 can be suppressed. Moreover, a ratio of the sum of the areas of the inscribed circles having the diameters of 90 μm or larger is from 10 to 50%, and hence a large number of "pores 26a in which the inscribed circles having the diameters of 90 μm or larger are drawn" are present in the partition walls 21. Therefore, even when the catalyst is, for example, an SCR catalyst for NO selective reduction which requires a comparatively large amount of catalyst to be carried, it is possible to suitably carry a sufficient amount of catalyst for performing purification of a component under purification.

If "the ratio of the sum of the areas of the inscribed circles having the diameters of 90 μm or larger in the sections" is smaller than 10%, the number of the large pores 26a where a large amount of catalyst can be carried is excessively small. In consequence, the amount of the catalyst which can be carried in the pores 26a cannot sufficiently be acquired. That is, when the large amount of catalyst is carried onto the honeycomb structure 120, the amount of the catalyst to be carried onto the surfaces of the partition walls 21 has to be increased in the same manner as in the conventional honeycomb structure. As a consequence, the pressure drop of the honeycomb structure 120 increases. Moreover, if "the ratio of the sum of the areas of the inscribed circles having the diameters of 90 μm or larger in the sections" exceeds 50%, the strength of the honeycomb structure 120 lowers, and the honeycomb structure 120 is easily damaged.

In the honeycomb structure 120 of the present embodiment, "the pores 26a in which the inscribed circles having the diameters of 90 μm or larger are drawn" are formed so that the ratio of the sum of the areas of the inscribed circles having the diameters of 90 μm or larger, with respect to the total area of all the pores 26, is from 10 to 50%. Therefore, the strength of the honeycomb structure 120 itself lowers, but in the pores 26 of the partition walls 21, a larger amount of catalyst can be carried as compared with the conventional honeycomb structure. In consequence, the strength of the honeycomb structure can be enhanced as compared with a conventional honeycomb structure having about the same pressure drop. That is, when the catalyst is actually carried and the honeycomb structure is used as the catalyst carrying member, a higher strength can be realized as compared with the conventional honeycomb structure.

"The ratio (S2/S1×100) of the inscribed circles drawn in the pores 26 and having the diameters of 90 μm or larger" can be measured as follows.

Figure 7A:
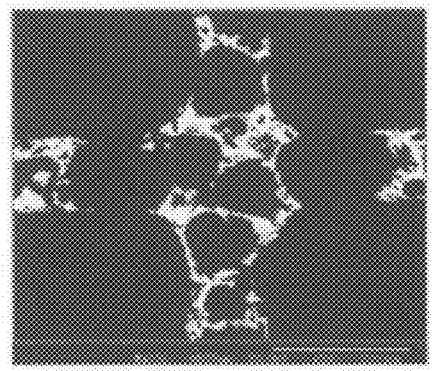
FIG. 7A is a micrograph of sections of partition walls, which is used to measure a ratio of inscribed circles drawn in pores and having diameters of 90 μm or larger in the embodiment of the honeycomb structure of the present invention (the second invention)

First, the honeycomb structure 120 of the present embodiment (see FIG. 4) is cut perpendicular to the extending direction of the cells 22. Next, as shown in FIG. 7A, an image of the cut surface is picked up by reflection electrons (an annular detector) of a scanning electron microscope "S-3200N (trade name)" manufactured by Hitachi, Ltd. An image pickup region of the cut surface (i.e. an image processing region) is preferably a region where an intersection of the partition walls 21 is positioned in the center of a picked-up image screen and one cell 22 is disposed in this image. For example, in FIG. 7A, a quarter (¼) of the cell 22 is reflected in each of four portions, i.e., an upper right portion, a lower right portion, an upper left portion and a lower left portion of the image. The image pickup of the cut surface is performed on the surface of the honeycomb structure which is perpendicular to the cell extending direction with a magnification of 200 times in a region of 600×500 μm. The image pickup of the cut surface is performed on 20 fields of view around a partition wall intersecting portion.

Figure 7B:
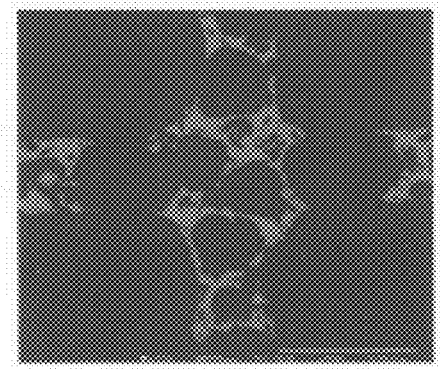
FIG. 7B is a micrograph of the sections of the partition walls, which is used to measure the ratio of the inscribed circles drawn in the pores and having the diameters of 90 μm or larger in the embodiment of the honeycomb structure of the present invention (the second invention)

Next, as shown in FIG. 7B, the obtained image is subjected to binarization processing by use of a trough between distribution modes (mode intensities) of a brightness histogram as a threshold value. Through the binarization processing of such a mode system, a substantive part of the partition wall 21 in the obtained image can be extracted.

Figure 7C:
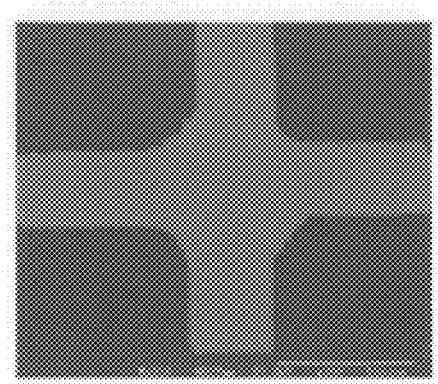
FIG. 7C is a micrograph of the sections of the partition walls, which is used to measure the ratio of the inscribed circles drawn in the pores and having the diameters of 90 pan or larger in the embodiment of the honeycomb structure of the present invention (the second invention)

Next, as shown in FIG. 7C, closing processing is performed to further extract a region of the partition walls. Hereinafter, the above region of the partition walls will be referred to as "the partition wall region" sometimes. In the closing processing, expansion processing and contraction processing are alternately performed once. Conditions of the closing processing are as follows. First, the above expansion processing is performed with a size of 200 pixels, and then the above contraction processing is performed with a size of 200 pixels.

Figure 7D:
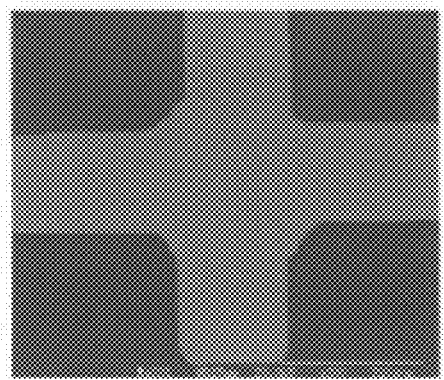
FIG. 7D is a micrograph of the sections of the partition walls, which is used to measure the ratio of the inscribed circles drawn in the pores and having the diameters of 90 μm or larger in the embodiment of the honeycomb structure of the present invention (the second invention)

Next, as shown in FIG. 7D, the partition wall region in FIG. 7C is expanded, and the expanded partition wall region is used as an analysis region for pore distinction. The above partition wall region is expanded so that any unnecessary inscribed circle is not fitted into a background portion of the expanded partition wall region in the following step. In consequence, the partition wall region is preferably expanded so that the above expanded portion becomes smaller than a radius of the smallest inscribed circle assumed when the inscribed circles are fitted. The "background portion of the expanded partition wall region" is a portion expanded from the substantive part of the partition wall in the analysis region to the periphery thereof. The radius of the assumed smallest inscribed circle is 45 μm.

Figure 7E:
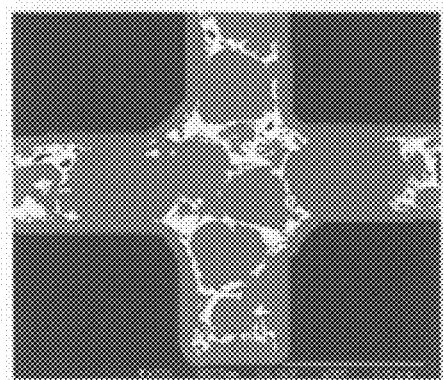
FIG. 7E is a micrograph of the sections of the partition walls, which is used to measure the ratio of the inscribed circles drawn in the pores and having the diameters of 90 μm or larger in the embodiment of the honeycomb structure of the present invention (the second invention)

Next, as shown in FIG. 7E, the analysis region in FIG. 7D is subjected to the binarization processing by use of the trough between the distribution modes (the mode intensities) of the brightness histogram. Through the binarization processing of such a mode system, the substantive part of the partition wall 21 in the image obtained in FIG. 7A can be extracted.

Figure 7F:
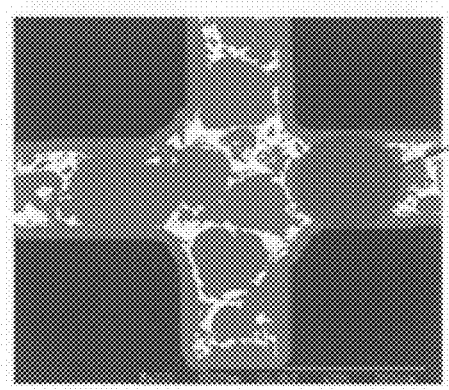
FIG. 7F is a micrograph of the sections of the partition walls, which is used to measure the ratio of the inscribed circles drawn in the pores and having the diameters of 90 μm or larger in the embodiment of the honeycomb structure of the present invention (the second invention)

Next, as shown in FIG. 7F, an inscribed circle 27a having a diameter of 90 μm or larger is fitted into "the analysis region from which the substantive part of the partition wall 21 is removed" of FIG. 7E. In this case, the inscribed circle 27a is not superimposed onto the substantive part of the partition wall 21. When the inscribed circle 27a is fitted, the position of the inscribed circle 27a is specified as a coordinate. Moreover, the diameter of the inscribed circle 27a is calculated, and the area of the inscribed circle 27a is calculated from the diameter of the inscribed circle 27a. As to the position of the inscribed circle 27a, an X-axis and a Y-axis are preferably defined in the image, to obtain an X-coordinate and a Y-coordinate of the center of the inscribed circle 27a. A portion into which the inscribed circle 27a is fitted is "the pore in which the inscribed circle having the diameter of 90 µm or larger is drawn".

Figure 7G:
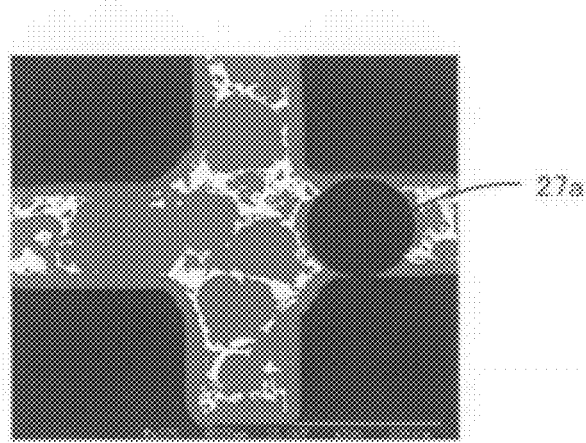
FIG. 7G is a micrograph of the sections of the partition walls, which is used to measure the ratio of the inscribed circles drawn in the pores and having the diameters of 90 μm or larger in the embodiment of the honeycomb structure of the present invention (the second invention)
Figure 7H:
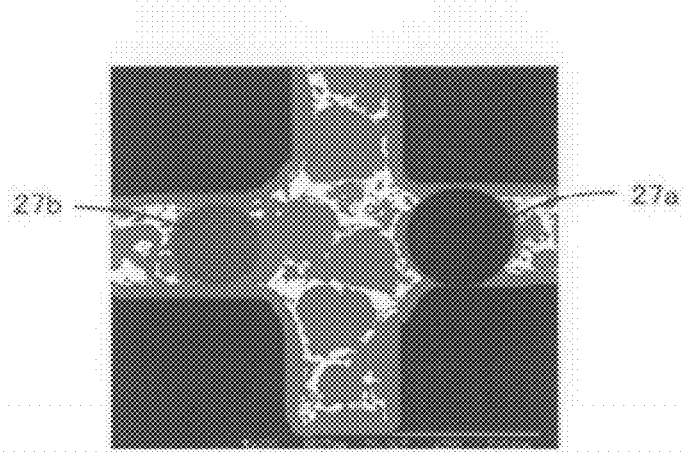
FIG. 7H is a micrograph of the sections of the partition walls, which is used to measure the ratio of the inscribed circles drawn in the pores and having the diameters of 90 μm or larger in the embodiment of the honeycomb structure of the present invention (the second invention)

Next, as shown in FIG. 7G, processing is performed to further remove the inscribed circle 27a fitted as shown in FIG. 7F from "the analysis region from which the substantive part of the partition wall 21 has been removed". Afterward, as shown in FIG. 7H, an inscribed circle 27b having a diameter of 90 µm or larger is again fitted into the analysis region from which the inscribed circle of FIG. 7G has been removed. When the inscribed circle 27b is fitted, the coordinate of the position of the inscribed circle 27b is specified. Furthermore, the area of the inscribed circle 27b is calculated from the diameter of the inscribed circle 27b. The operation of FIG. 7G and FIG. 7H is repeated until "the inscribed circle having the diameter of 90 µm or larger" cannot be fitted. FIG. 7A to FIG. 7H are micrographs of the section of the partition wall which is used to measure the ratio of the inscribed circles drawn in the pores and having the diameters of 90 µm or larger in the embodiment of the honeycomb structure of the present invention (the second invention).

Through the above operation, all the inscribed circles having the diameters of 90 µm or larger are obtained among the inscribed circles drawn in the pores of the image. Then, the areas of the obtained inscribed circles are added up, to calculate "the sum of the areas of the inscribed circles having the diameters of 90 µm or larger". "The sum of the areas of the inscribed circles having the diameters of 90 µm or larger" is an arithmetic average value of 20 fields of view (i.e., images of 20 fields of view).

Moreover, "the total area of all the pores in the section" can be obtained, from the image of the cut surface, as the threshold value of the trough between the distribution modes (the mode intensities) of the brightness histogram. "The total area of all the pores in the section" is an arithmetic average value of 20 fields of view (i.e., the images of 20 fields of view).

In the present embodiment, the pores in which the inscribed circles having the diameters of 90 µm or larger are drawn will be referred to as the large pores sometimes. Moreover, a ratio of "the sum of the areas of the inscribed circles having the diameters of 90 µm or larger", with respect to "the total area of all the pores in the section", will be referred to simply as "the area ratio of the inscribed circles having the diameters of 90 µm or larger" sometimes. In the honeycomb structure of the present embodiment, the large pores are formed in the partition walls so that "the area ratio of the inscribed circles having the diameters of 90 µm or larger" obtained by the above method becomes from 10 to 50%. The area ratio of the inscribed circles having the diameters of 90 µm or larger is preferably from 10 to 50%, further preferably from 10 to 40%, and especially preferably from 10 to 30%. When the area ratio of the inscribed circles having the diameters of 90 µm or larger is in the above range, the honeycomb structure having a high strength can be obtained while acquiring the sufficient amount of the catalyst to be carried.

The other constitutions of the honeycomb structure of the present embodiment except that "the area ratio of the inscribed circles having the diameters of 90 µm or larger" is from 10 to 50% are preferably similar to those of the honeycomb structure of the above first invention. That is, the shape of the honeycomb structure, the thickness of each partition wall, the porosity of the partition wall, the average pore diameter of the pores and the like preferably have constitutions similar to those of the honeycomb structure of the above first invention.

Moreover, the honeycomb structure of the present embodiment can be manufactured by adding, for example, a pore former having a large average particle diameter to a raw material for manufacturing the honeycomb structure. Examples of the pore former having the large average particle diameter include a pore former having an average particle diameter of 90 µm or larger. Specifically, the pore former having an average particle diameter of 90 µm or larger is first added to the raw material for manufacturing the honeycomb structure. Next, a kneaded clay is prepared from the raw material to which the above pore former has been added. Next, the obtained kneaded clay is extruded to form a honeycomb formed article. Next, the obtained honeycomb formed article is fired. Through this firing, the pores in which the inscribed circles having the diameters of 90 µm or larger are drawn are formed in the partition walls by use of the above pore former.

The pore former is preferably deformed or contracted by a pressure during the extrusion-forming, and preferably passes through slits of a die for extrusion-forming. Examples of the pore former include a water absorptive polymer and a starch. Moreover, the pore former may expand to form the pores in which the inscribed circles having the diameters of 90 µm or larger are drawn during the firing of the honeycomb formed article.

An amount of the pore former to be added can appropriately be selected in consideration of the porosity of each partition wall, the ratio of the pores in which the inscribed circles having the diameters of 90 µm or larger are drawn, the average pore diameter, and the like. The ratio of the pores in which the inscribed circles having the diameters of 90 µm or larger are drawn is "the area ratio of the inscribed circles having the diameters of 90 µm or larger". Moreover, a particle size distribution of the pore former also has an influence on the ratio of the pores in which the inscribed circles having the diameters of 90 µm or larger are drawn. Therefore, the particle size distribution of the pore former and the amount of the pore former to be added are preferably adjusted to prepare the kneaded clay.

There will be described an example of the manufacturing of a honeycomb structure in which a partition wall thickness is 110 µm and an area ratio of inscribed circles having diameters of 90 µm or larger is from 10 to 50%. When the honeycomb structure having the above constitution is manufactured, the amount of the pore former to be added is preferably from 1.0 to 8.0 parts by mass, with respect to 100 parts by mass of a main raw material for preparing the forming kneaded clay. Examples of the main raw material for preparing the forming kneaded clay include a ceramic raw material.

Figure 8:
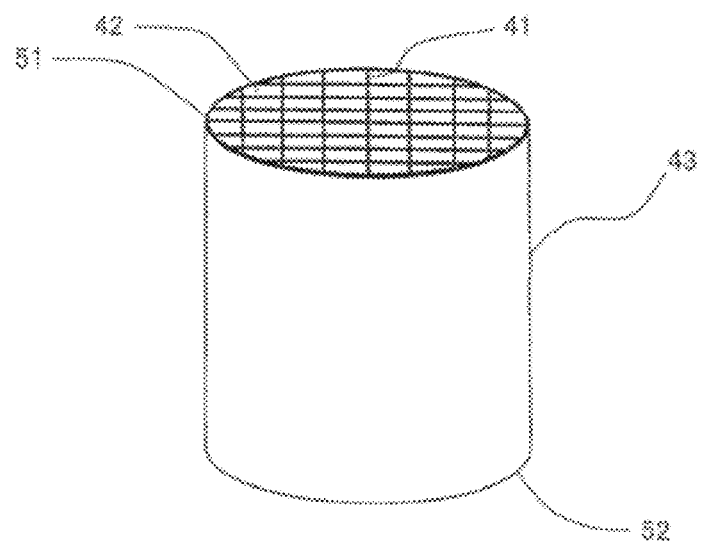
FIG. 8 is a perspective view schematically showing an embodiment of a honeycomb structure of the present invention (the third invention)
Figure 9:
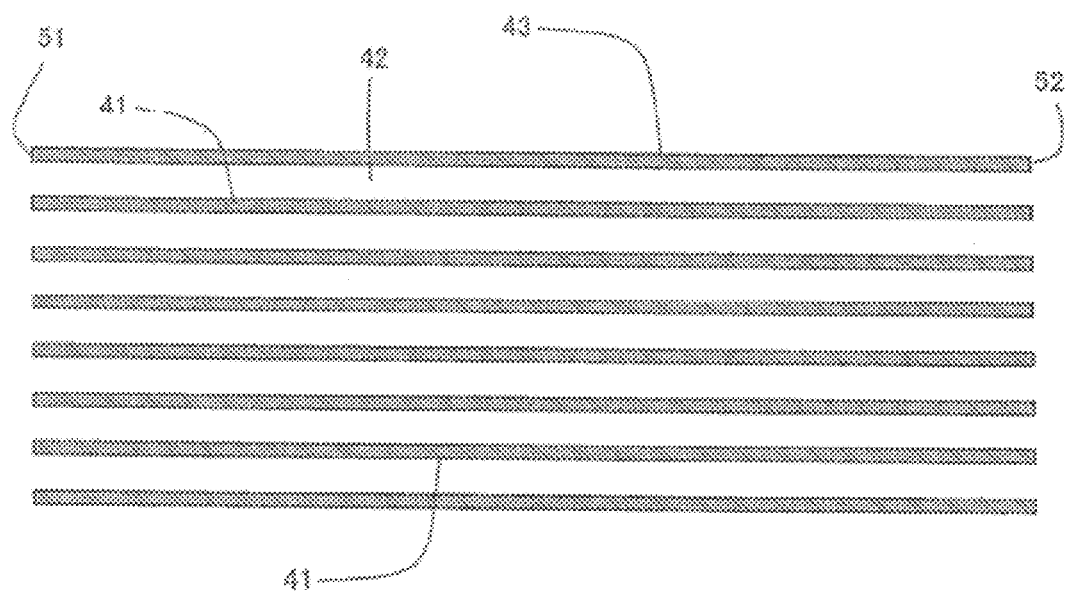
FIG. 9 is an exemplary diagram showing a section of the embodiment of the honeycomb structure of the present invention (the third invention) which is parallel to a cell extending direction.
Figure 10:
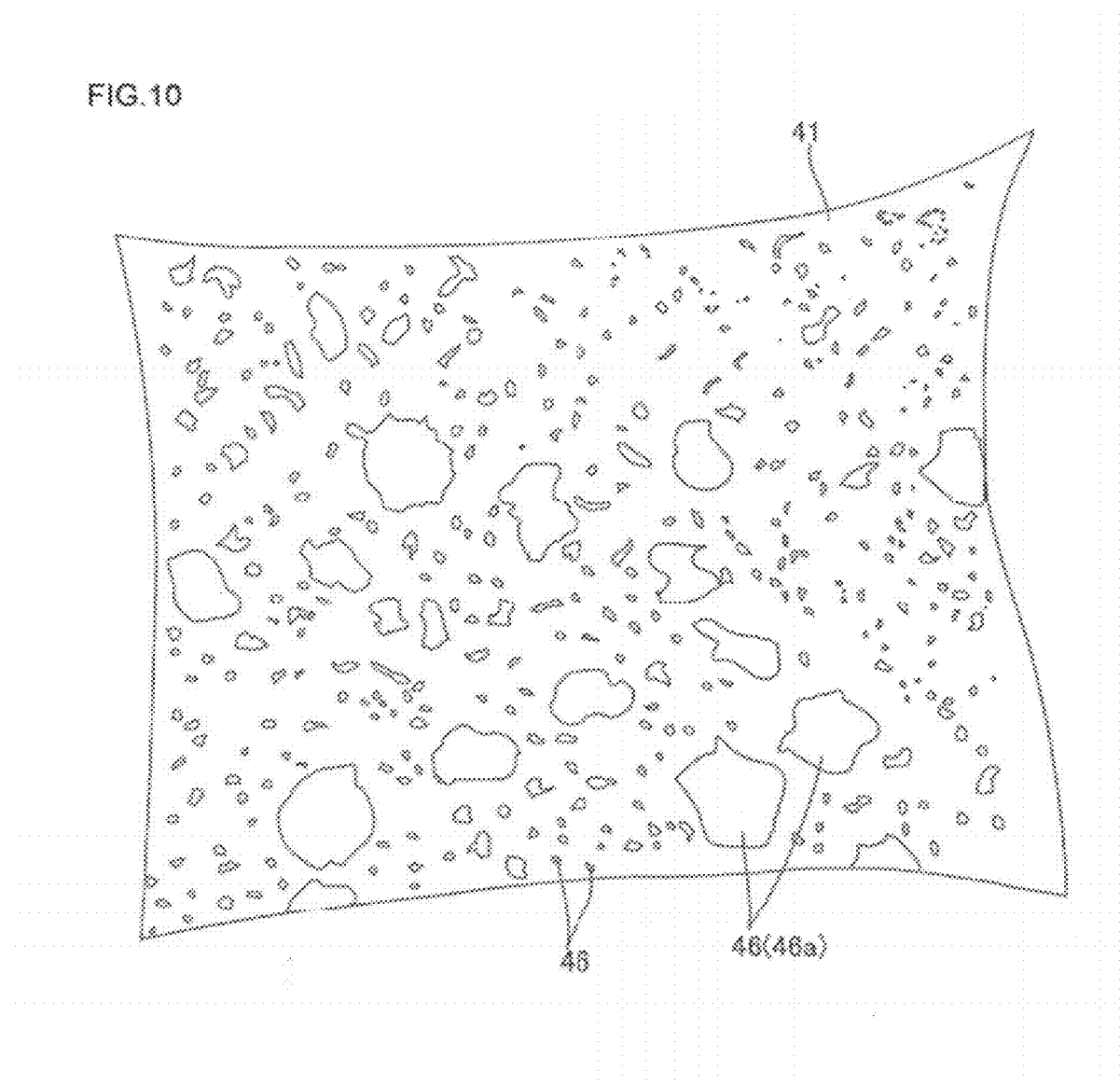
FIG. 10 is an exemplary diagram showing an enlarged surface of a partition wall of the embodiment of the honeycomb structure of the present invention (the third invention)

(3) Honeycomb Structure (the Third Invention):

An embodiment of a honeycomb structure of the present invention (the third invention) will be described. As shown in FIG. 8 to FIG. 10, a honeycomb structure 140 of the present embodiment includes porous partition walls 41 in which a plurality of pores 46 are formed. By the porous partition walls 41, a plurality of cells 42 that become through channels of a fluid are partitioned. The honeycomb structure 140 of the present embodiment satisfies the following constitution. In the surface of each of the partition walls 41, a ratio of a sum S4 of areas of inscribed circles having diameters of 60 μm or larger among inscribed circles drawn in open frontal areas of the pores 46 opened in the surface of the partition wall 41, with respect to an area S3 of the surface of the partition wall 41, is from 2 to 10%. The ratio is a value represented by a percentage indicated by S4/S3×100.

Here, FIG. 8 is a perspective view schematically showing the embodiment of the honeycomb structure of the present invention (the third invention). FIG. 9 is an exemplary diagram showing a section of the embodiment of the honeycomb structure of the present invention (the third invention) which is parallel to a cell extending direction. FIG. 10 is an exemplary diagram showing an enlarged surface of a partition wall in the embodiment of the honeycomb structure of the present invention (the third invention). It is to be noted that the honeycomb structure 140 shown in FIG. 8 and FIG. 9 is a tubular honeycomb structure including the porous partition walls 41 and an outer peripheral wall 43 positioned in the outermost periphery thereof. By the porous partition walls 41, the plurality of cells 42 extending from one end surface 51 to another end surface 52 are partitioned.

When the honeycomb structure 140 of the present embodiment is used as a catalyst carrier, a large amount of catalyst can be introduced into the pores 46 through "pores 46a in which the inscribed circles having the diameters of 60 μm or larger are drawn". Therefore, a larger amount of catalyst can be carried onto the insides of the partition walls 41 (i.e. the insides of the pores 46). In consequence, an amount of the catalyst to be carried onto the surfaces of the partition walls 41 can relatively be decreased as compared with a honeycomb structure which is used as a conventional catalyst carrier. Therefore, an increase in pressure drop of the honeycomb structure 140 can be suppressed. Moreover, the ratio of the sum of the areas of the inscribed circles having the diameters of 60 μm or larger is from 2 to 10%, and hence a large number of "pores 46a in which the inscribed circles having the diameters of 60 μm or larger are drawn" are present in the surfaces of the partition walls 41. Therefore, even when the catalyst is, for example, an SCR catalyst for $NO_x$ selective reduction which requires a comparatively large amount of catalyst to be carried, it is possible to introduce, into the pores, the sufficient amount of catalyst for performing purification of a component under purification.

If "the ratio of the sum of the areas of the inscribed circles having the diameters of 60 μm or larger in the partition wall surface" is smaller than 2%, the ratio of the pores 46a into which a large amount of catalyst can be introduced is excessively small. In consequence, the amount of the catalyst which can be carried in the pores 46 cannot sufficiently be acquired. That is, when the large amount of catalyst is carried onto the honeycomb structure 140, the amount of the catalyst to be carried onto the surfaces of the partition walls 41 has to be increased in the same manner as in the conventional honeycomb structure. As a consequence, the pressure drop of the honeycomb structure 140 increases. Moreover, if "the ratio of the sum of the areas of the inscribed circles having the diameters of 60 μm or larger in the partition wall surface" exceeds 10%, the strength of the honeycomb structure 140 lowers, and the honeycomb structure 140 is easily damaged.

In the honeycomb structure 140 of the present embodiment, "the pores 46a where the inscribed circles having the diameters of 60 μm or larger are drawn in the open frontal areas" are formed so that the ratio of the sum of the areas of the inscribed circles having the diameters of 60 μm or larger, with respect to the area of the surface of the partition wall 41, is from 2 to 10%. Therefore, the strength of the honeycomb structure 140 itself lowers sometimes, but the catalyst can easily be introduced into the pores 46 of the partition walls 41. Therefore, a larger amount of catalyst can be carried as compared with the conventional honeycomb structure. In consequence, the strength of the honeycomb structure can be enhanced as compared with a conventional honeycomb structure having about the same pressure drop. That is, when the catalyst is actually carried and the honeycomb structure is used as the catalyst carrying member, a higher strength can be realized as compared with the conventional honeycomb structure. The above conventional honeycomb structure having about the same pressure drop is a honeycomb structure in which the open frontal areas of the pores in the partition wall surface are small.

"The ratio (S4/S3×100) of the inscribed circles drawn in the pores 46 of the surface of the partition wall 41 and having the diameters of 60 μm or larger" can be measured as follows.

Figure 11A:
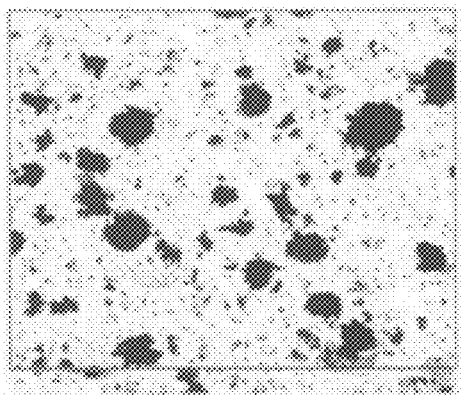
FIG. 11A is a micrograph of a partition wall surface which is used to measure a ratio of inscribed circles drawn in open frontal areas of the partition wall surface and having diameters of 60 μm or larger in the embodiment of the honeycomb structure of the present invention (the third invention)

First, the honeycomb structure 140 of the present embodiment (see FIG. 8) is cut in parallel with the extending direction of the cells 42 so that the partition wall surface can be observed. Next, as shown in FIG. 11A, an image of the partition wall surface is picked up by reflection electrons (an annular detector) of a scanning electron microscope "S-3200N (trade name)" manufactured by Hitachi, Ltd. The image pickup of the partition wall surface is performed in a direction which is perpendicular to the partition wall surface. Moreover, the image pickup of the partition wall surface is performed with a magnification of 100 times in a region of 1200×1000 μm, and performed on 20 fields of view around a central portion between the partition walls in the perpendicular direction from the partition wall surface.

Figure 11B:
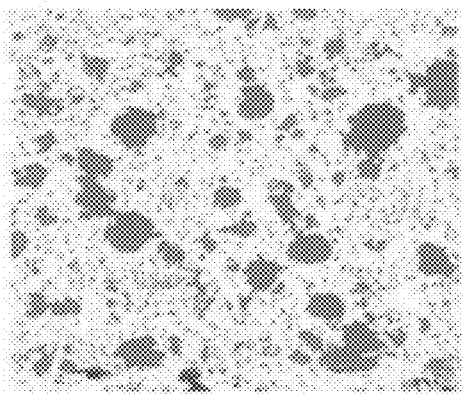
FIG. 11B is a micrograph of the partition wall surface which is used to measure the ratio of the inscribed circles drawn in the open frontal areas of the partition wall surface and having the diameters of 60 μm or larger in the embodiment of the honeycomb structure of the present invention (the third invention)

Next, as shown in FIG. 11B, the obtained image is subjected to binarization processing by use of a brightness of 20 in an image of a difference between the original image and a smoothed image as a threshold value. The above memory of the binarization processing is a method also referred to as a dynamic threshold value method. Through such binarization processing, the open frontal areas of the pores of the obtained image can be extracted. The open frontal areas of the pores in the image are void portions in the partition wall surface.

Figure 11C:
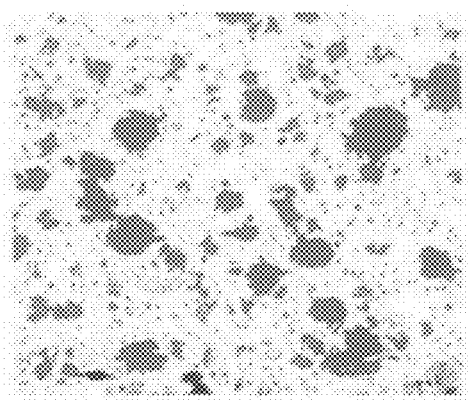
FIG. 11C is a micrograph of the partition wall surface which is used to measure the ratio of the inscribed circles drawn in the open frontal areas of the partition wall surface and having the diameters of 60 μm or larger in the embodiment of the honeycomb structure of the present invention (the third invention)

Next, as shown in FIG. 11C, noise processing is performed to remove a micro region from the extracted void portion. The micro region is, for example, a remarkably small region where any inscribed circle having a diameter of 60 μm or larger is not fitted. Through this noise processing, the remarkably small region where any inscribed circle having the diameter of 60 μm or larger is not fitted is eliminated, and the subsequent analysis is easily performed. A region subjected to the noise processing is "the analysis region".

Figure 11D:
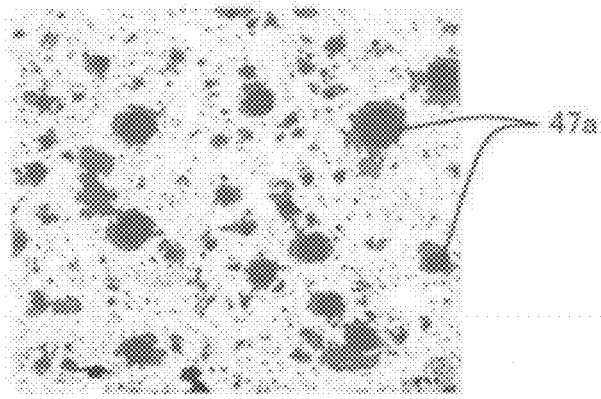
FIG. 11D is a micrograph of the partition wall surface which is used to measure the ratio of the inscribed circles drawn in the open frontal areas of the partition wall surface and having the diameters of 60 μm or larger in the embodiment of the honeycomb structure of the present invention (the third invention)

Next, as shown in FIG. 11D, inscribed circles 47a having diameters of 60 μm or larger are fitted into "the analysis regions" of FIG. 11C. In this case, the circles are fitted so that the inscribed circles 47a are not superimposed on a substantive part of the partition wall 41. When the inscribed circle 47a is fitted, a position of the inscribed circle 47a is specified as a coordinate. Moreover, a diameter of the inscribed circle 47a is calculated, and an area of the inscribed circle 47a is calculated from the diameter of the inscribed circle 47a. As to the position of the inscribed circle 47a, an X-axis and a Y-axis are preferably defined in the image, to obtain an X-coordinate and a Y-coordinate of the center of the inscribed circle 47a. A portion into which the inscribed circle 47a is fitted is "the pore 47a where the inscribed circle having the diameter of 60 μm or larger is drawn in the open frontal area".

Figure 11E:
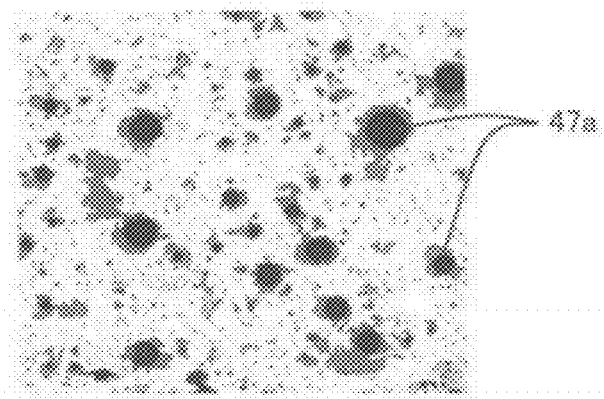
FIG. 11E is a micrograph of the partition wall surface which is used to measure the ratio of the inscribed circles drawn in the open frontal areas of the partition wall surface and having the diameters of 60 μm or larger in the embodiment of the honeycomb structure of the present invention (the third invention)
Figure 11F:
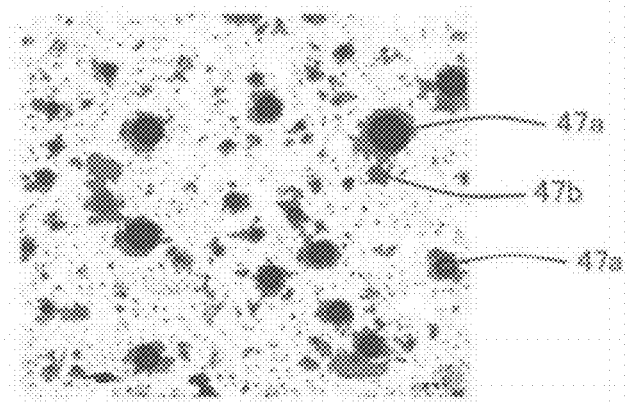
FIG. 11F is a micrograph of the partition wall surface which is used to measure the ratio of the inscribed circles drawn in the open frontal areas of the partition wall surface and having the diameters of 60 μm or larger in the embodiment of the honeycomb structure of the present invention (the third invention)
Figure 11G:
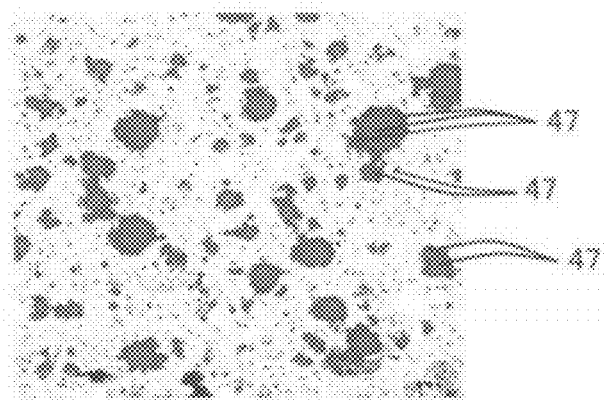
FIG. 11G is a micrograph of the partition wall surface which is used to measure the ratio of the inscribed circles drawn in the open frontal areas of the partition wall surface and having the diameters of 60 μm or larger in the embodiment of the honeycomb structure of the present invention (the third invention)

Next, as shown in FIG. 11E, processing is performed to further remove the inscribed circle 47a fitted as shown in FIG. 11D from "the analysis region". Afterward, as shown in FIG. 11F, an inscribed circle 47b having a diameter of 60 μm or larger is again fitted into the analysis region of FIG. 11E from which the inscribed circle has been removed. When the inscribed circle 47b is fitted, the coordinate of the position of the inscribed circle 47b is specified. Furthermore, the area of the inscribed circle 47b is calculated from the diameter of the inscribed circle 47b. The operation of FIG. 11E and FIG. 11F is repeated until "the inscribed circle 47 having the diameter of 60 μm or larger" cannot be fitted (see FIG. 11G). FIG. 11A to FIG. 11G are micrographs of the partition wall surface which is used to measure the ratio of the inscribed circles drawn in the open frontal areas of the partition wall surface and having the diameters of 60 μm or larger in the embodiment of the honeycomb structure of the present invention (the third invention).

Through the above operation, all the inscribed circles having the diameters of 60 μm or larger are obtained among the inscribed circles drawn in the pores of the image. Then, the areas of the obtained inscribed circles are added up, to calculate "the sum of the areas of the inscribed circles having the diameters of 60 μm or larger". "The sum of the areas of the inscribed circles having the diameters of 60 μm or larger" is an arithmetic average value of 20 fields of view (i.e., images of 20 fields of view).

Moreover, "the area of the surface of the partition wall" can be measured by obtaining the surface of the partition wall picked up in the image. "The area of the surface of the partition wall" is an arithmetic average value of 20 fields of view (i.e., the images of 20 fields of view).

In the present embodiment, the pores where the inscribed circles having the diameters of 60 μm or larger are drawn in the open frontal areas will be referred to as the large pores sometimes. Moreover, a ratio of "the sum of the areas of the inscribed circles having the diameters of 60 μm or larger", with respect to "the area of the surface of the partition wall 41", will be referred to simply as "the area ratio of the inscribed circles having the diameters of 60 μm or larger" sometimes. In the honeycomb structure of the present embodiment, the large pores are formed in the partition wall surface so that "the area ratio of the inscribed circles having the diameters of 60 μm or larger" obtained by the above method becomes 2 to 10%. The area ratio of the inscribed circles having the diameters of 60 μm or larger is preferably from 2 to 10%, further preferably from 2 to 8%, and especially preferably from 2 to 6%. When the area ratio of the inscribed circles having the diameters of 60 μm or larger is in the above range, the honeycomb structure having a high strength can be obtained while acquiring the sufficient amount of the catalyst to be carried.

The other constitutions of the honeycomb structure of the present embodiment except that "the area ratio of the inscribed circles having the diameters of 60 μm or larger" is from 2 to 10% are preferably similar to those of the honeycomb structure of the above first invention. That is, the shape of the honeycomb structure, the thickness of each partition wall, the porosity of the partition wall, the average pore diameter of the pores and the like preferably have constitutions similar to those of the honeycomb structure of the above first invention.

Moreover, the honeycomb structure of the present embodiment can be manufactured by adding, for example, a pore former having a large average particle diameter to a raw material for manufacturing the honeycomb structure. Examples of the pore former having the large average particle diameter include a pore former having an average particle diameter which is not smaller than the thickness of the partition wall. Specifically, the pore former having an average particle diameter which is not smaller than the thickness of the partition wall is first added to the raw material for manufacturing the honeycomb structure. Next, a kneaded clay is prepared from the raw material to which the above pore former has been added. Next, the obtained kneaded clay is extruded to form a honeycomb formed article. Next, the obtained honeycomb formed article is fired. Through this firing, the pores where the inscribed circles having the diameters of 60 μm or larger are drawn in the open frontal areas of the partition wall surface are formed by use of the pore former.

The pore former is preferably deformed or contracted by a pressure during the extrusion-forming, and preferably passes through slits of a die for extrusion-forming. Examples of the pore former include a water absorptive polymer and a starch. Moreover, the pore former may expand to form the pores where the inscribed circles having the diameters of 60 μm or larger are drawn in the open frontal areas of the partition wall surface during the firing of the honeycomb formed article.

An amount of the pore former to be added can appropriately be selected in consideration of the porosity of each partition wall, the ratio of the pores in which the inscribed circles having the diameters of 60 μm or larger are drawn, the average pore diameter, and the like. The ratio of the pores in which the inscribed circles having the diameters of 60 μm or larger are drawn is "the area ratio of the inscribed circles having the diameters of 60 μm or larger". Moreover, a particle size distribution of the pore former also has an influence on the ratio of the pores in which the inscribed circles having the diameters of 60 μm or larger are drawn. Therefore, the particle size distribution of the pore former and the amount of the pore former to be added are preferably adjusted to prepare the kneaded clay.

There will be described an example of the manufacturing of a honeycomb structure in which a partition wall thickness is 110 μm and an area ratio of inscribed circles having diameters of 60 μm or larger in the partition wall surface is from 2 to 10%. When the honeycomb structure having the above constitution is manufactured, the amount of the pore former to be added is preferably from 1.0 to 8.0 parts by mass, with respect to 100 parts by mass of a main raw material for preparing the forming kneaded clay. Examples of the main raw material for preparing the forming kneaded clay include a ceramic raw material.

Figure 12:
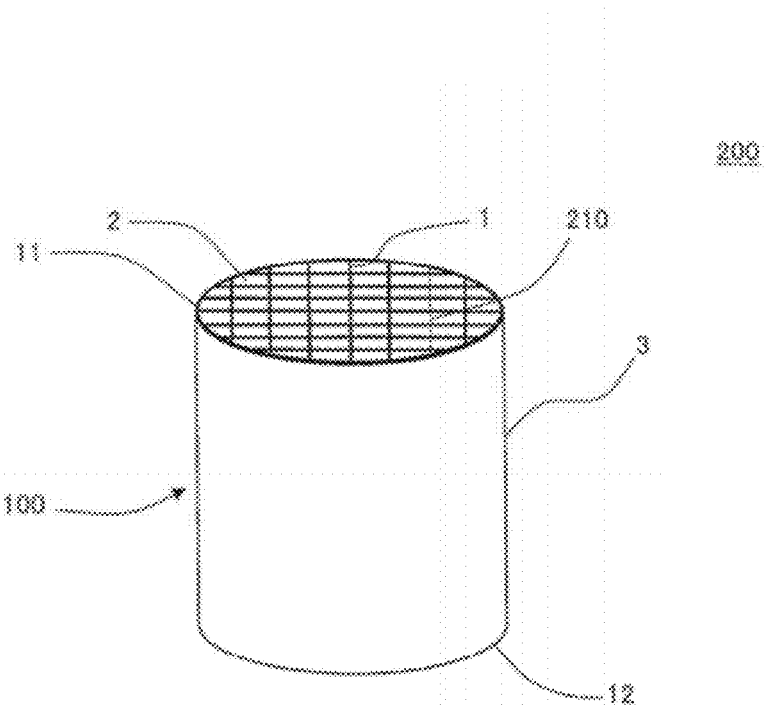
FIG. 12 is a perspective view schematically showing an embodiment of a catalyst carrying honeycomb structure of the present invention (the fourth invention)
Figure 13:
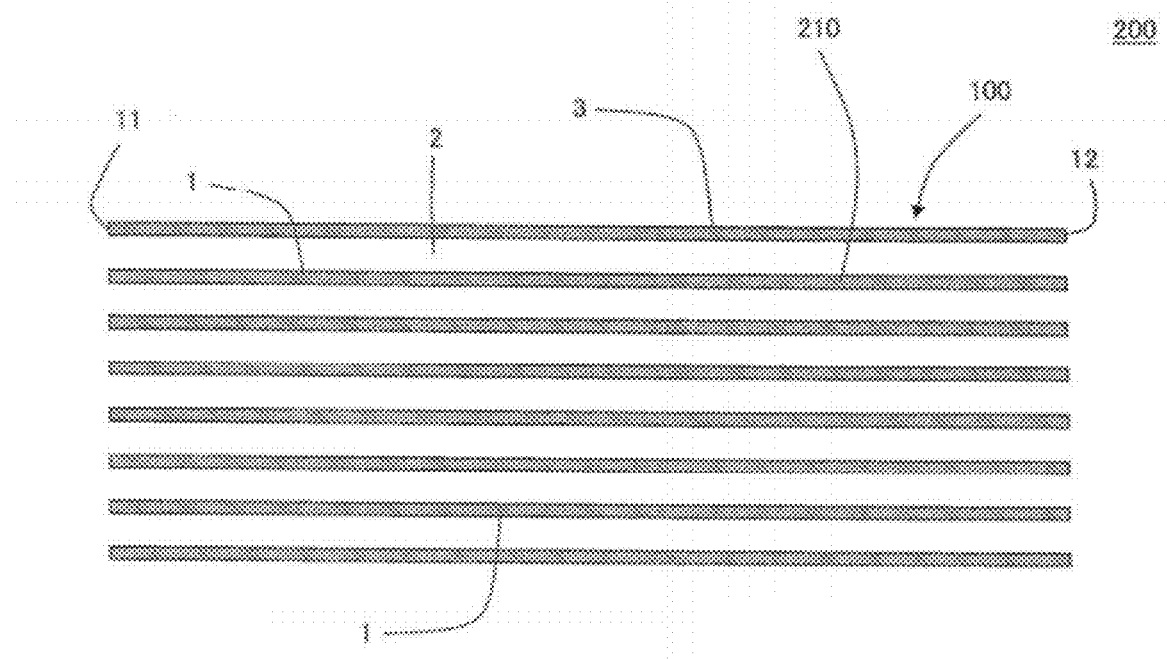
FIG. 13 is an exemplary diagram showing a section of the embodiment of the catalyst carrying honeycomb structure of the present invention (the fourth invention) which is parallel to a cell extending direction.
Figure 14:
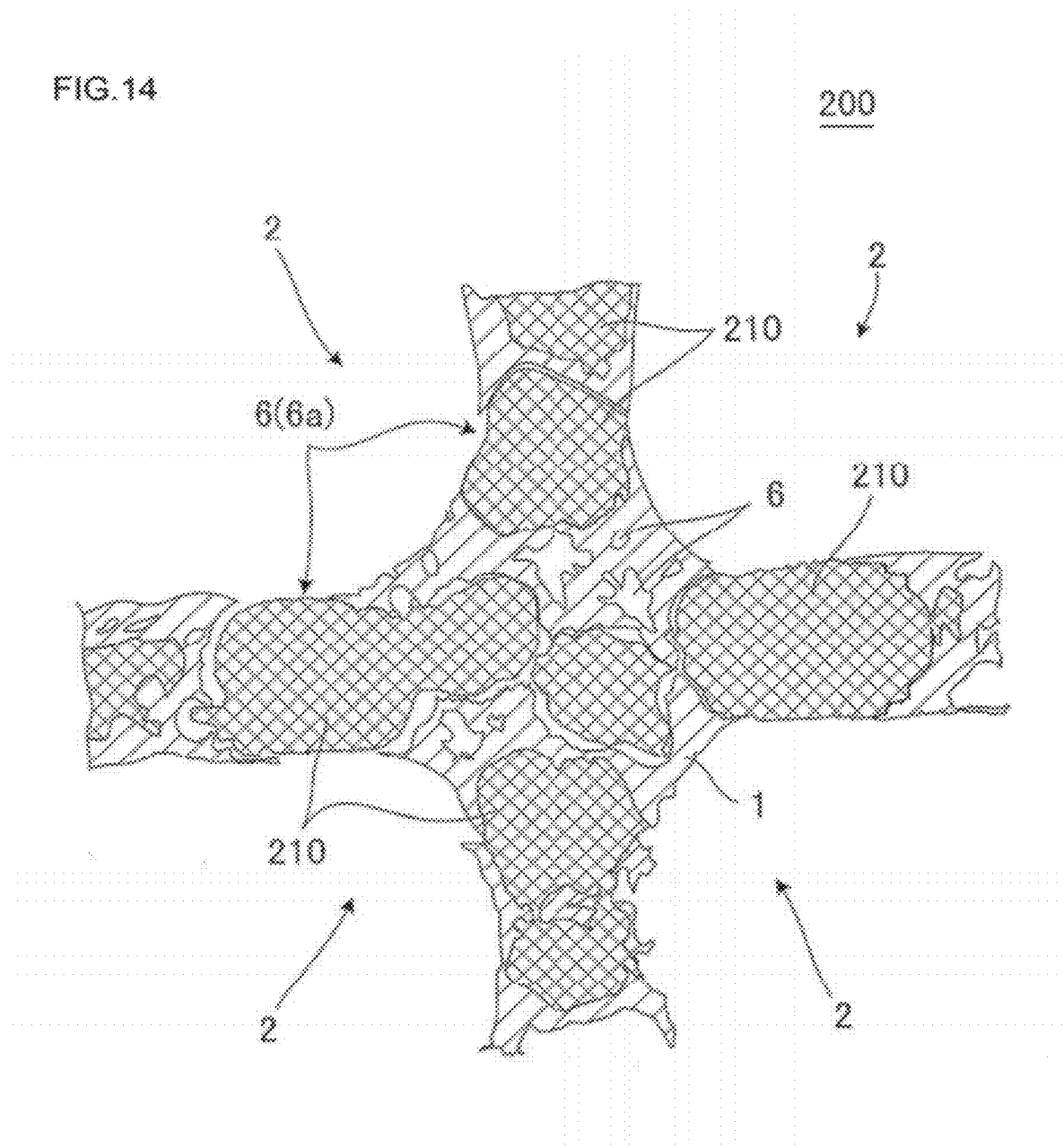
FIG. 14 is an exemplary diagram showing an enlarged section of the embodiment of the catalyst carrying honeycomb structure of the present invention (the fourth invention) which is cut perpendicular to the cell extending direction.

(4) Catalyst Carrying Honeycomb Structure (the Fourth Invention):

Next, an embodiment of a catalyst carrying honeycomb structure of the present invention (the fourth invention) will be described. As shown in FIG. 12 to FIG. 14, a catalyst carrying honeycomb structure 200 of the present embodiment includes a honeycomb structure 100, and a catalyst 210 charged into pores 6 of partition walls 1 of the honeycomb structure 100. In the catalyst carrying honeycomb structure 200 of the present embodiment, a ratio of the sum of volumes of the pores 6 into which the catalyst 210 has been charged, with respect to the total volume of the pores 6 of the partition walls 1, is from 70 to 100%.

Here, FIG. 12 is a perspective view schematically showing the embodiment of the catalyst carrying honeycomb structure of the present invention (the fourth invention). FIG. 13 is an exemplary diagram showing a section of the embodiment of the catalyst carrying honeycomb structure of the present invention (the fourth invention) which is parallel to a cell extending direction. FIG. 14 is an exemplary diagram showing an enlarged section of the embodiment of the catalyst carrying honeycomb structure of the present invention (the fourth invention) which is perpendicular to the cell extending direction.

FIG. 12 to FIG. 14 show an example where the honeycomb structure 100 shown in FIG. 1 to FIG. 3 is used as the catalyst carrying honeycomb structure 200. In the honeycomb structure of the present embodiment, the honeycomb structure 120 shown in FIG. 4 to FIG. 6 or the honeycomb structure 140 shown in FIG. 8 to FIG. 10 can be used. That is, the honeycomb structures of the above-mentioned first to third inventions can be used as catalyst carriers. It is to be noted that in FIG. 12 to FIG. 14, constitutional elements having constitutions similar to those of the honeycomb structure 100 shown in FIG. 1 to FIG. 3 are denoted with the same marks, and the description thereof is omitted.

In the catalyst carrying honeycomb structure 200 of the present embodiment, the ratio of the volume of the pores 6 into which the catalyst 210 has been charged, with respect to the total volume of the pores 6 of the partition walls 1, is from 70 to 100%. Hereinafter, "the ratio of the volume of the pores 6 into which the catalyst 210 has been charged, with respect to the total volume of the pores 6 of the partition walls 1", will be referred to as "the catalyst charge ratio" sometimes. In the catalyst carrying honeycomb structure 200 of the present embodiment, a remarkably large amount of the catalyst 210 is charged into large pores 6a. Therefore, according to the catalyst carrying honeycomb structure 200 of the present embodiment, the purification of a component under purification can remarkably suitably be performed.

The catalyst charge ratio is preferably from 70 to 100%, further preferably from 75 to 100%, and especially preferably from 80 to 100%. According to such a constitution, the large pores are formed in the partition walls of the honeycomb structure. In consequence, even if the strength of the honeycomb structure lowers, a larger amount of the catalyst is charged so as to close the large pores. In consequence, the large pores are closed with this catalyst, which can enhance the strength of the catalyst carrying honeycomb structure 200.

The catalyst charge ratio can be obtained by the following method. First, the catalyst carrying honeycomb structure is cut perpendicular to a cell extending direction. Next, the section is picked up with a scanning electron microscope (SEM). Next, the obtained image is analyzed to obtain "a pore area in the partition walls (the total area of the pores)" and "the areas of the pores into which the catalyst is charged". Next, the catalyst charge ratio is obtained from the ratio of "the area of the pores into which the catalyst is charged", with respect to "the pore area in the partition walls (the total area of the pores)". That is, the pore area in the partition walls and a catalyst area charged into the partition walls are measured from the image of the SEM, to obtain a ratio at which the catalyst is charged into the pores of the partition walls. In consequence, it is possible to calculate the catalyst charge ratio (%). A more specific calculation method is as follows. First, the catalyst carrying honeycomb structure of the present embodiment is cut perpendicular to the cell extending direction. Next, this section is picked up by reflection electrons (an annular detector) of a scanning electron microscope (e.g., a scanning electron microscope "S-3200N (trade name)" manufactured by Hitachi, Ltd) with a magnification of 200 times in a region of 600×500 µm. The image pickup is performed on 20 fields of view around a partition wall intersecting portion. Through image analysis of the obtained image, the pore area in the partition walls and the catalyst area charged into the partition walls are measured. A ratio (%) of "the area of the pores into which the catalyst is charged", with respect to "the pore area in the partition walls", is "the catalyst charge ratio (%)". It is to be noted that "the pore area in the partition walls" and "the area of the pores into which the catalyst is charged" are arithmetic average values of 20 fields of view (i.e. images of 20 fields of view). It can be considered that "the area of the pores into which the catalyst is charged" is the area of the catalyst in the pores of the above image.

There is not any special restriction on the catalyst which is used in the catalyst carrying honeycomb structure of the present embodiment. Examples of the catalyst include an SCR catalyst for $NO_x$ selective reduction, a three-way catalyst, an oxidation catalyst, and an $NO_x$ adsorber. For example, the SCR catalyst for $NO_x$ selective reduction requires a comparatively large amount of the catalyst to be carried. The catalyst carrying honeycomb structure of the present embodiment indicates that the honeycomb structure including large pores where the catalyst can be carried (charged) is used as the catalyst carrier. Therefore, the sufficient amount of the catalyst for performing the purification of the component under purification can be carried in the pores.

The SCR catalyst for $NO_x$ selective reduction contains at least one selected from the group consisting of metal-substituted zeolite, vanadium, titania, tungsten oxide, silver, and alumina. Moreover, examples of the NO adsorber include an alkali metal and/or an alkali earth metal. Examples of the alkali metal include K, Na and Li. Examples of the alkali earth meal include Ca. The oxidation catalyst contains a noble metal. A suitable example of this noble metal is one or more selected from the group consisting of Pt, Rh and Pd. The three-way catalyst mainly purifies hydrocarbons (HC), carbon monoxides (CO) and nitrogen oxides ($NO_x$). Examples of the three-way catalyst include a catalyst containing platinum (Pt), palladium (Pd) and rhodium (Rh). By this three-way catalyst, the hydrocarbon is purified into water and carbon dioxide, the carbon monoxide is purified into carbon dioxide, and the nitrogen oxide is purified into nitrogen, respectively, by oxidation or reduction.

(5) Manufacturing Method of Honeycomb Structure (the Fifth Invention):

Next, an embodiment of a manufacturing method of a honeycomb structure of the present invention (the fifth invention) will be described. The manufacturing method of the honeycomb structure of the present embodiment is a manufacturing method of a honeycomb structure by which the above-mentioned honeycomb structures of the first to third inventions can suitably be manufactured.

The manufacturing method of the honeycomb structure of the present embodiment includes a kneaded clay preparing step, a forming step, and a firing step. The kneaded clay preparing step is a step of mixing and kneading forming raw materials containing a ceramic raw material to obtain a kneaded clay. The forming step is a step of forming the obtained kneaded clay into a honeycomb shape to obtain a honeycomb formed article. The firing step is a step of drying and firing the obtained honeycomb formed article to obtain the honeycomb structure. The honeycomb structure includes porous partition walls. By the porous partition walls, a plurality of cells that become through channels of a fluid are partitioned. In the manufacturing method of the honeycomb structure of the present embodiment, in the kneaded clay preparing step, a pore former having an average particle diameter larger than a thickness of each of the partition walls of the obtained honeycomb structure is added to the ceramic raw material to prepare the kneaded clay.

According to the manufacturing method of the honeycomb structure of the present embodiment, remarkably large pores can be formed in the partition walls of the obtained honeycomb structure as compared with a conventional honeycomb structure. The remarkably large pores are, for example, pores having sizes larger than the thickness of each partition wall. Moreover, according to the manufacturing method of the honeycomb structure of the present embodiment, it is possible to simply manufacture, for example, a honeycomb structure where in sections of the partition walls cut perpendicular to a cell extending direction, a ratio of the sum of areas of inscribed circles having diameters of 90 μm or larger among inscribed circles drawn in the pores in the sections, with respect to the total area of all the pores in the sections, is from 10 to 50%. Furthermore, according to the manufacturing method of the honeycomb structure of the present embodiment, it is possible to simply manufacture, for example, a honeycomb structure where in the surfaces of the partition walls, a ratio of the sum of areas of inscribed circles having diameters of 60 μm or larger among inscribed circles drawn in open frontal areas of pores opened in the surfaces of the partition walls, with respect to the sum of areas of the surfaces of the partition walls, is from 2 to 10%.

For example, the pore former is preferably deformed or contracted by a pressure during extrusion-forming, and preferably passes through slits of a die for extrusion-forming. Examples of such a pore former include a pore former having a contractility. Examples of the pore former include a water absorptive polymer and a starch. When the pore former is the water absorptive polymer, the average particle diameter of the water absorptive polymer in a water saturation state is further preferably larger than the thickness of the partition wall.

Hereinafter, each manufacturing step of the manufacturing method of the honeycomb structure of the present embodiment will be described in more detail.

(5-1) Kneaded Clay Preparing Step:

First, in the manufacturing method of the honeycomb structure of the present embodiment, the forming raw materials containing the ceramic raw material are mixed and kneaded to obtain the kneaded clay. In the kneaded clay preparing step, the pore former having an average particle diameter larger than the thickness of each partition wall of the obtained honeycomb structure is added to the ceramic raw material.

The ceramic raw material contained in the forming raw materials is preferably at least one selected from the group consisting of a cordierite forming raw material, cordierite, silicon carbide, a silicon-silicon carbide composite material, mullite, alumina, aluminum titanate, silicon nitride, and a silicon carbide-cordierite composite material. It is to be noted that the cordierite forming raw material is the ceramic raw material having a chemical composition obtained by blending 42 to 56 mass % of silica, 30 to 45 mass % of alumina, and 12 to 16 mass % of magnesia. The cordierite forming raw material is fired to become cordierite.

There is not any special restriction on the pore former, as long as the average particle diameter of the pore former is larger than the thickness of each partition wall of the obtained honeycomb structure. As the pore former, the water absorptive polymer, the starch or the like can suitably be used. The water absorptive polymer or the like includes particles having a contractility. Therefore, even when the particles are larger than the slits of the die for extrusion-forming, the particles can be deformed to pass through slit spaces.

The amount of the pore former to be added is preferably from 1.0 to 8.0 parts by mass, further preferably from 1.0 to 6.0 parts by mass, and especially preferably from 1.0 to 4.0 parts by mass, with respect to 100 parts by mass of a main raw material. The main raw material means, for example, the ceramic raw material contained in the forming raw material. If the amount of the pore former to be added is smaller than 1.0 part by mass, the ratio of the large pores formed in the partition walls decreases sometimes. Therefore, the amount of the catalyst which can be carried onto the obtained honeycomb structure decreases sometimes. On the other hand, if the amount of the pore former to be added exceeds 8.0 parts by mass, the ratio of the large pores becomes excessively large, and the strength of the obtained honeycomb structure lowers sometimes.

There is not any special restriction on the average particle diameter of the pore former, as long as the average particle diameter thereof is larger than the thickness of each partition wall of the obtained honeycomb structure. The average particle diameter of the pore former is preferably from 1.2 to 2.5 times, further preferably from 1.2 to 2.0 times, and especially preferably from 1.2 to 1.5 times as much as the thickness of the partition wall. If the average particle diameter of the pore former is smaller than 1.2 times as much as the thickness of the partition wall, large pores having pore diameters larger than the thickness of the partition wall are not actually easily formed. In consequence, the volume ratio of the large pores in the obtained honeycomb structure lowers sometimes. On the other hand, if the average particle diameter exceeds 2.5 times as much as the thickness of the partition wall, the slits of the die for extrusion-forming are clogged with the pore former sometimes.

In the particle size distribution of the pore former, the largest peak in the particle size distribution is preferably a particle diameter which is 1.2 times or more as much as the thickness of each partition wall of the obtained honeycomb structure. In consequence, catalyst coating properties can be enhanced.

Moreover, the forming raw material is preferably prepared by further mixing the ceramic raw material and the pore former with a dispersion medium, an organic binder, an inorganic binder, a surfactant or the like. There is not any special restriction on a composition ratio of the respective raw materials. The composition ratio of the respective raw materials is preferably a composition ratio adapted to, for example, the constitution, the material or the like of the honeycomb structure to be prepared.

As the dispersion medium, water can be used. The amount of the dispersion medium to be added is preferably from 30 to 150 parts by mass, with respect to 100 parts by mass of the ceramic raw material.

The organic binder is preferably methylcellulose, hydroxypropyl methylcellulose, hydroxypropyl ethylcellulose, hydroxyethylcellulose, carboxymethylcellulose, polyvinyl alcohol or a combination thereof. Moreover, the amount of the organic binder to be added is preferably form 1 to 10 parts by mass, with respect to 100 parts by mass of the ceramic raw material.

As the surfactant, ethylene glycol, dextrin, fatty acid soap, polyalcohol or the like can be used. A type of surfactant may be used alone, or a combination of two or more of the surfactants may be used. The amount of the surfactant to be added is preferably from 0.1 to 5.0 parts by mass, with respect to 100 parts by mass of the ceramic raw material.

There is not any special restriction on a method of kneading the forming raw materials to form the kneaded clay. Examples of a method of forming the kneaded clay include methods using a kneader, a vacuum clay kneader and the like.

(5-2) Forming Step:

Next, the obtained kneaded clay is formed into a honeycomb shape to obtain a honeycomb formed article (the forming step). There is not any special restriction on the method of forming the kneaded clay to obtain the honeycomb formed article. Examples of the forming method include a known forming method such as extrusion-forming and injection-forming. Examples of the method suitably include a method of extruding the kneaded clay by use of a die having a desirable cell shape, partition wall thickness and cell density to form the honeycomb formed article. As a material of the die, a hard metal which does not easily wear is preferable.

In the manufacturing method of the honeycomb structure of the present embodiment, there is used the pore former having an average particle diameter larger than the thickness of each partition wall of the obtained honeycomb structure. Therefore, particles of part of the pore former have sizes larger than a width of each slit of the extrusion-forming die which is used in the extrusion-forming. However, a pore former such as the water absorptive polymer is deformed or contracted by a pressure during the extrusion-forming, and can pass through the slits.

There is not any special restriction on a shape of the honeycomb formed article. Examples of the shape of the honeycomb formed article preferably include a cylindrical shape, a tubular shape with elliptic end surfaces, and a tubular shape with polygonal end surfaces. Examples of the polygonal shape include a square shape, a rectangular shape, a triangular shape, a pentangular shape, a hexagonal shape, and an octagonal shape.

(5-3) Firing Step:

Next, the obtained honeycomb formed article is dried and fired to obtain the honeycomb structure including the porous partition walls by which a plurality of cells that become through channels of a fluid are partitioned (the firing step). In consequence, it is possible to suitably manufacture the honeycomb structure where larger pores are formed in the partition walls as compared with the conventional honeycomb structure. The firing to obtain the honeycomb structure will be referred to as the final firing sometimes.

There is not any special restriction on a drying method. Examples of the drying method include hot air drying, microwave drying, dielectric drying, reduced pressure drying, vacuum drying, and freeze-drying. Above all, the dielectric drying, the microwave drying or the hot air drying is preferably performed alone, or a combination thereof is preferably performed.

This honeycomb formed article is preferably calcinated before the final firing of the honeycomb formed article. The calcinating is performed for degreasing. There is not any special restriction on a calcinating method, as long as at least part of an organic substance in the honeycomb formed article can be removed. Examples of the organic substance in the honeycomb formed article include an organic binder, a surfactant and a pore former. Usually, a burning temperature of the organic binder is from about 100 to 300° C. Moreover, a burning temperature of the pore former is from about 200 to 800° C. Therefore, during the calcinating, heating is preferably performed at about 200 to 1000° C. in an oxidation atmosphere for about ten to 100 hours.

The final firing of the honeycomb formed article is performed to sinter and densify the forming raw materials constituting the calcinated formed article, thereby acquiring a predetermined strength. Firing conditions of temperature, time, atmosphere and the like differ with type of the forming raw material. Therefore, appropriate conditions may be selected in accordance with the type of the raw material. For example, when the cordierite forming raw material is used, a firing temperature is preferably from 1350 to 1440° C. Moreover, as the firing time, a highest temperature keeping time is preferably from 3 to 10 hours. There is not any special restriction on a device which performs the calcinating and the final firing, but an electric furnace, a gas furnace or the like can be used.

(6) Manufacturing Method of Honeycomb Structure (the Sixth Invention):

Next, an embodiment of a manufacturing method of a honeycomb structure of the present invention (the sixth invention) will be described. The manufacturing method of the honeycomb structure of the present embodiment is a manufacturing method of a honeycomb structure by which the above-mentioned honeycomb structures of the first to third inventions can suitably be manufactured.

The manufacturing method of the honeycomb structure of the present embodiment includes a kneaded clay preparing step, a forming step, and a firing step. The kneaded clay preparing step is a step of mixing and kneading forming raw materials containing a ceramic raw material to obtain a kneaded clay. The forming step is a step of forming the obtained kneaded clay into a honeycomb shape to obtain a honeycomb formed article. The firing step is a step of drying and firing the obtained honeycomb formed article to obtain the honeycomb structure. The honeycomb structure includes porous partition walls. By the porous partition walls, a plurality of cells that become through channels of a fluid are partitioned. In the manufacturing method of the honeycomb structure of the present embodiment, in the clay preparing step, a pore former having an average particle diameter which is smaller than a thickness of each of the partition walls of the obtained honeycomb structure and becomes larger than the thickness of the partition wall owing to thermal expansion is added to the ceramic raw material to prepare the kneaded clay.

In the manufacturing method of the honeycomb structure of the present embodiment, there is used, as a pore former, "the pore former having an average particle diameter which is smaller than the thickness of each of the partition walls of the obtained honeycomb structure and becomes larger than the thickness of the partition wall owing to the thermal expansion". In consequence, it can be considered that in the manufacturing method, the above pore former is used, in place of "the pore former having a large average particle diameter" for use in the manufacturing method of the honeycomb structure of the above fifth invention. The honeycomb structure can be manufactured by a method similar to that of the embodiment of the fifth invention except that the above pore former is used.

When the formed article is fired, the pore former added to the kneaded clay expands, whereby large pores can be formed in the partition walls. Examples of such a pore former having an expansibility suitably include a non-expanding resin balloon. Specific examples of the resin balloon include an acrylic microcapsule.

The pore former which is use din the manufacturing method of the honeycomb structure of the present embodiment is preferably a pore former having an average particle diameter smaller than the thickness of each partition wall of the obtained honeycomb structure during the kneaded clay preparation and extrusion-forming. The thickness of the partition wall of the honeycomb structure is, in other words, a width of each slit of the die for extrusion-forming. In the manufacturing method of the honeycomb structure of the present embodiment, the pore former preferably does not expand until the extrusion-forming ends to obtain the formed article. When such a pore former is used, the extrusion-forming can suitably be performed.

There is not any special restriction on the average particle diameter of the unexpanded pore former. However, the pore former preferably expands so that the average particle diameter thereof becomes larger than the thickness of the partition wall during the firing in the firing step.

The average particle diameter of the expanded pore former is preferably from 1.2 to 2.5 times, further preferably from 1.2 to 2.0 times, and especially preferably from 1.2 to 1.5 times as much as the thickness of the partition wall. If the average particle diameter of the pore former is smaller than 1.2 times as much as the thickness of the partition wall, the pores having pore diameters larger than the thickness of the partition wall are not actually easily formed. In consequence, the volume ratio of the large pores lowers sometimes. The average particle diameter of the expanded pore former can be measured by the following measurement method. First, the unexpanded resin balloon and a dispersant are mixed to obtain a slurry containing the unexpanded resin balloon. Next, vapor is applied to the obtained slurry, to foam the unexpanded resin balloon in the slurry. Afterward, the particle size of the foamed resin balloon is measured by a heretofore known method to measure the average particle diameter of the expanded pore former.

There is not any special restriction on an expansion ratio of the pore former. The expansion ratio of the pore former is a ratio (i.e., a magnification) of the average particle diameter of the expanded pore former, with respect to the average particle diameter of the unexpanded pore former. For example, the expansion ratio of the pore former is preferably 1.2 times or larger, further preferably 1.5 times or larger, and especially preferably 2 times or larger. If the expansion ratio of the pore former is smaller than 1.2 times, the slits of the die are clogged with the pore former sometimes during the forming.

An amount of the pore former to be added is preferably from 2 to 15 parts by mass, further preferably from 2 to 10 parts by mass, and especially preferably from 4 to 8 parts by mass, with respect to 100 parts by mass of a main raw material. The main raw material means, for example, the ceramic raw material contained in the forming raw material. If the amount of the pore former to be added is smaller than 2 parts by mass, the ratio of the large pores formed in the partition walls decreases sometimes. Therefore, the amount of the catalyst which can be carried onto the obtained honeycomb structure decreases sometimes. On the other hand, if the amount of the pore former to be added exceeds 15 parts by mass, the ratio of the large pores becomes excessively large, and the strength of the obtained honeycomb structure lowers sometimes.

EXAMPLES

Hereinafter, a honeycomb structure of the present invention and a manufacturing method thereof will further specifically be described based on examples, but the present invention is not limited to these examples.

Example 1

In Example 1, a cordierite forming raw material was used as a ceramic raw material. A water absorptive polymer was added as a pore former to this cordierite forming raw material to prepare a kneaded clay. The obtained kneaded clay was extruded to form a honeycomb formed article. The obtained honeycomb formed article was fired to prepare a honeycomb structure. A thickness of each partition wall of the honeycomb structure was 100 μm.

First, as the cordierite forming raw materials, talc, kaolin, calcined kaolin, alumina and aluminum hydroxide were used to prepare the kneaded clay. As to a mass ratio of the cordierite forming raw materials, 40 parts by mass of talc, 15 parts by mass of kaolin, 28 parts by mass of calcined kaolin, 12 parts by mass of alumina and 5 parts by mass of aluminum hydroxide were used. Moreover, an average particle diameter of talc was 10 μm. An average particle diameter of kaolin was 5 μm. An average particle diameter of calcined kaolin was 2 μm. An average particle diameter of alumina was 5 μm. An average particle diameter of aluminum hydroxide was 1 μm.

To 100 parts by mass of the cordierite forming raw material, 1.0 part by mass of a pore former was added. As the pore former, the water absorptive polymer having an average particle diameter of 125 μm was used. Furthermore, 5.6 parts by mass of binder, 0.5 part by mass of surfactant and 50 parts by mass of water were added to obtain a forming raw material. As the binder, methylcellulose was used. As the surfactant, potash soap laurate was used. The obtained forming raw material was kneaded by using a kneader to obtain the kneaded clay.

Next, the obtained kneaded clay was extruded to form a honeycomb formed article. A width of each slit of a die for extrusion-forming was 110 μm which corresponded to the partition wall thickness of the honeycomb structure. The obtained honeycomb formed article had a partition wall thickness of 100 μm and a cell density of 62 cells/cm$^2$. The whole shape of the honeycomb structure was a cylindrical shape. A diameter of each end surface of the honeycomb structure was 70 mm, and a length of the honeycomb structure along a cell extending direction was 120 mm. A cell shape which was orthogonal to the cell extending direction was a square shape. The obtained honeycomb formed article was dried with microwaves and hot air.

Next, the honeycomb formed article was heated at 200° C. for 12 hours to perform degreasing. Furthermore, the degreased honeycomb formed article was heated at 1425° C. for seven hours to perform firing, thereby obtaining the honeycomb structure.

As to the obtained honeycomb structure, there were measured, by the following methods, "a volume ratio (%) of pores having pore diameters larger than the thickness of the partition wall", "an area ratio (%) of inscribed circles having diameters of 90 μm or larger", "an area ratio (%) of inscribed circles having diameters of 60 μm or larger", "a porosity (%)", "an average pore diameter (%)", "a thermal expansion coefficient (ppm/K)", "a catalyst charge ratio (%)", "a pressure drop ratio (-) with a catalyst" and "an isostatic strength (MPa)". Measurement results are shown in Table 2.

[Volume Ratio (%) of Pores Having Pore Diameters Larger than the Thickness of the Partition Wall]

A pore distribution of the pores formed in the partition walls of the honeycomb structure was measured. In this pore distribution, the pores having pore diameters larger than the thickness of the partition wall of the honeycomb structure" were regarded as "the pores having pore diameters larger than the thickness of the partition wall". The partition wall thickness was 100 μm. "The volume ratio (%) of the pores having pore diameters larger than the thickness of the partition wall" was calculated as a ratio (%) of the pore diameters which were not smaller than the thickness of the partition wall of the honeycomb structure, occupied in the whole pore distribution. The pore distribution was measured with trade name: Autopore 9500 manufactured by Micromeritics Instrument Corporation.

[Area Ratio (%) of Inscribed Circles Having Diameters of 90 μm or Larger]

The honeycomb structure was cut perpendicular to a cell extending direction. Next, an image of the cut surface of the honeycomb structure was picked up by reflection electrons (an annular detector) of a scanning electron microscope. As the scanning electron microscope, S-3200N (trade name) manufactured by Hitachi, Ltd. was used. The image of the cut surface was picked up on the surface of the honeycomb structure which was perpendicular to the cell extending direction with a magnification of 200 times in a region of 600×500 µm. The image pickup of the cut surface was performed on 20 fields of view around a partition wall intersecting portion. Next, the obtained image was subjected to binarization processing (the binarization processing of a mode method) by use of a trough between distribution modes (mode intensities) of a brightness histogram as a threshold value. Next, expansion processing and contraction processing were alternately performed once to perform closing processing, thereby further extracting a region of the partition walls. Hereinafter, the region of the partition walls will be referred to as "the partition wall region" sometimes. In the closing processing, the expansion processing was first performed with a size of 200 pixels, and then the contraction processing was performed with a size of 200 pixels. Next, the obtained partition wall region was expanded, and the expanded partition wall region was used as an analysis region for pore distinction.

Next, the expanded analysis region was subjected to the binarization processing by use of the trough between the distribution modes (the mode intensities) of the brightness histogram as the threshold value. Next, an inscribed circle having a diameter of 90 µm or larger was fitted into the image subjected to the binarization processing. In this case, the inscribed circle was fitted so that the inscribed circle was not superimposed onto a substantive part of the partition wall. When the inscribed circle was fitted, the position of the inscribed circle was specified as a coordinate. Moreover, a diameter of the inscribed circle was calculated, and an area of the inscribed circle was calculated from the diameter of the inscribed circle. As to the position of the inscribed circle, an X-axis and a Y-axis were defined in the image, to obtain an X-coordinate and a Y-coordinate of the center of the inscribed circle. Next, processing was performed to further remove the fitted inscribed circle from "the analysis region".

Next, the processing was performed to further remove the fitted inscribed circle from "the analysis region". Afterward, an inscribed circle having a diameter of 90 µm or larger was again fitted into the analysis region from which the inscribed circle had been removed. When the inscribed circle was fitted, the coordinate of the position of the inscribed circle was specified. Furthermore, the area of the inscribed circle was calculated from the diameter of the inscribed circle. The above operation was repeated until "the inscribed circle having the diameter of 90 µm or larger" could not be fitted. The inscribed circles were fitted into all the pores where the inscribed circles having the diameters of 90 µm or larger were drawn. The obtained areas of the inscribed circles were added up, to calculate "the sum of the areas of the inscribed circles having the diameters of 90 µm or larger".

Moreover, "the total area of all the pores in the section" was obtained from the image of the cut surface, as the threshold value of the trough between the distribution modes (the mode intensities) of the brightness histogram.

Afterward, a ratio of "the sum of the areas of the inscribed circles having the diameters of 90 µm or larger", with respect to "the total area of all the pores in the section", (the area ratio (%) of the inscribed circles having the diameters of 90 µm or larger) was calculated. "The sum of the areas of the inscribed circles having the diameters of 90 µm or larger" and "the total area of all the pores in the section" were obtained as arithmetic average values of 20 fields of view (i.e., images of 20 fields of view). Therefore, "the area ratio (%) of the inscribed circles having the diameters of 90 µm or larger" became a value calculated by use of the arithmetic average values of "the sum of the areas of the inscribed circles having the diameters of 90 µm or larger" and "the total area of all the pores in the section".

[Area Ratio (%) of Inscribed Circles Having Diameters of 60 µm or Larger]

First, the honeycomb structure was cut in parallel with the extending direction of the cells so that the partition wall surface of the honeycomb structure could be observed. Next, an image of the partition wall surface was picked up by reflection electrons (an annular detector) of a scanning electron microscope. As the scanning electron microscope, S-3200N (trade name) manufactured by Hitachi, Ltd. was used. The image pickup of the partition wall surface was performed in a direction which was perpendicular to the partition wall surface. Moreover, the image pickup of the partition wall surface was performed with a magnification of 100 times in a region of 1200×1000 µm. The image pickup of the partition wall surface was performed on 20 fields of view. Next, the obtained image was subjected to binarization processing (the binarization processing by a dynamic threshold value method). A difference between the original image and a smoothed image was taken, and a brightness of 20 in a difference image was used as a threshold value. Next, noise processing was performed on conditions of a remarkably micro region where any inscribed circle having a diameter of 60 µm or larger was not fitted, to remove the micro region from an extracted void portion. A region subjected to the above noise processing was obtained as "the analysis region".

Next, inscribed circles having diameters of 60 µm or larger were fitted into "the analysis regions". In this case, the circles were fitted so that the inscribed circles were not superimposed on the substantive part of the partition wall. When the inscribed circle was fitted, a position of the inscribed circle was specified as a coordinate. Moreover, a diameter of this inscribed circle was calculated, and an area of the inscribed circle was calculated from the diameter of the inscribed circle. As to the position of the inscribed circle, an X-axis and a Y-axis were defined in the image, to obtain an X-coordinate and a Y-coordinate of the center of the inscribed circle.

Next, processing was performed to further remove the fitted inscribed circle from "the analysis region". Afterward, an inscribed circle having a diameter of 60 µm or larger was again fitted into the analysis region from which the inscribed circle had been removed. When the inscribed circle was fitted, the coordinate of the position of this inscribed circle was specified. Furthermore, the area of the inscribed circle was calculated from the diameter of this inscribed circle. Subsequently, the above operation was repeated until "the inscribed circle having the diameter of 60 µm or larger" could not fitted, whereby the inscribed circles were fitted into all the pores where the inscribed circles having the diameters of 60 µm or larger were drawn. Then, the obtained areas of the inscribed circles were added up, to calculate "the sum of the areas of the inscribed circles having the diameters of 60 µm or larger".

Moreover, "the area of the surface of the partition wall" can be measured by obtaining the surface of the partition wall picked up in the image.

Afterward, a ratio (the area ratio (%) of the inscribed circles having the diameters of 60 µm or larger) of "the sum of the areas of the inscribed circles having the diameters of 60 µm or larger", with respect to "the area of the surface of the partition wall", was calculated. "The sum of the areas of the inscribed circles having the diameters of 60 µm or larger" and "the area of the surface of the partition wall" were obtained as arithmetic average values of 20 fields of view (i.e., the images of 20 fields of view). Therefore, "the area ratio (%) of the inscribed circles having the diameters of 60 µm or larger"

became a value calculated by use of the arithmetic average values of "the sum of the areas of the inscribed circles having the diameters of 60 µm or larger" and "the area of the surface of the partition wall".

[Porosity (%)]

A porosity (%) was measured through mercury porosimetry by use of trade name: Autopore 9500 manufactured by Micromeritics Instrument Corporation.

[Average Pore Diameter (%)]

An average pore diameter (%) was measured through the mercury porosimetry by use of trade name: Autopore 9500 manufactured by Micromeritics Instrument Corporation.

[Thermal Expansion Coefficient (ppm/K)]

A thermal expansion coefficient (ppm/K) was measured by use of trade name: 2S-TMA manufactured by Rigakusha.

[Catalyst Charge Ratio (%)]

First, 260 g/L of catalyst was carried onto the honeycomb structure, to obtain a catalyst carrying honeycomb structure. The catalyst carrying honeycomb structure was cut perpendicular to the extending direction of the cells. Next, an image of this section was picked up by reflection electrons (an annular detector) of a scanning electron microscope with a magnification of 200 times in a region of 600×500µm. The image pickup was performed on 20 fields of view around a partition wall intersecting portion. As the scanning electron microscope, trade name: S-3200N manufactured by Hitachi, Ltd. was used. Through the image analysis of the obtained image, a pore area in the partition walls and an area of the catalyst charged into the partition walls were measured. A ratio (%) of the catalyst area of the charged catalyst, with respect to the pore area in the partition walls, was obtained as "the catalyst charge ratio (%)".

[Pressure Drop Ratio (–) with Catalyst]

A ratio of a pressure drop of each of honeycomb structures of examples and comparative examples, with respect to a pressure drop of Comparative Example 1, was calculated. The pressure drop of each of the honeycomb structures of the examples and comparative examples was a pressure drop in a state where the catalyst was carried in the above measurement of the catalyst charge ratio (%). The pressure drops were measured by the following method. First, the catalyst was carried onto each honeycomb structure, to obtain the catalyst carrying honeycomb structure. A ceramic mat was wound around this catalyst carrying honeycomb structure, and the catalyst carrying honeycomb structure was placed into a container. Next, three cubic meters of room-temperature air was passed through the catalyst carrying honeycomb structure every minute, to measure pressures in an upstream-side end surface and a downstream-side end surface of the catalyst carrying honeycomb structure. A pressure difference (a differential pressure) between the measured pressures was obtained. The above "pressure difference" was obtained as "the pressure drop ratio (–) with the catalyst".

[Isostatic Strength (MPa)]

The honeycomb structure was inserted into a flexible tube, and a homogeneous pressure due to a water pressure was applied thereto, to measure a pressure with which partial breakdown occurred. The pressure with which the partial breakdown occurred was obtained as the isostatic strength (MPa).

Examples 2 to 24 and Comparative Examples 1 to 7

Honeycomb structures were manufactured in the same manner as in Example 1 except that "a water absorptive polymer" or "a unexpanded resin balloon" was used as a pore former as shown in Table 1 and Table 3 and a blend amount of water was changed as shown in Table 1 and Table 3. It is to be noted that as the unexpanded resin balloon, an acrylic microcapsule was used. Moreover, the average particle diameter of the unexpanded resin balloon in Table 3 indicates an average particle diameter of the unexpanded resin balloon which has been expanded.

Figure 15:
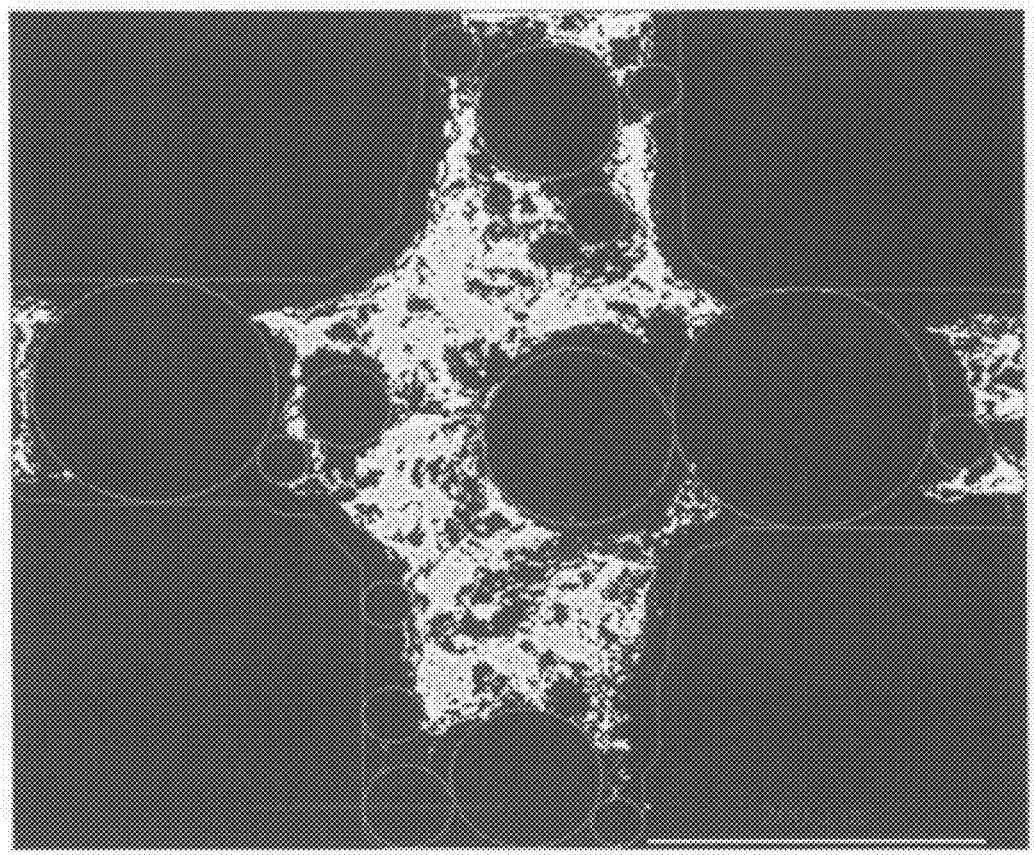
FIG. 15 is a micrograph which is used to measure "an area ratio of inscribed circles having diameters of 90 μm or larger" in a honeycomb structure of Example 7.
Figure 16:
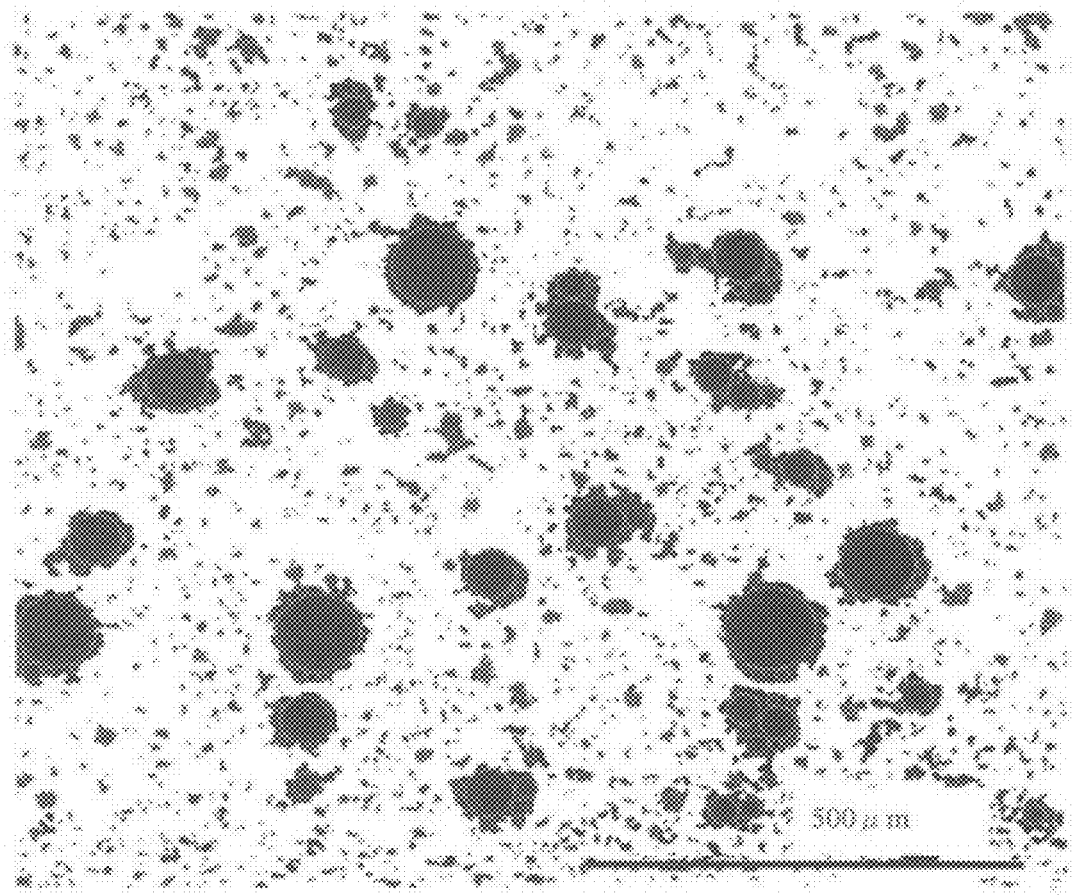
FIG. 16 is a micrograph which is used to measure "an area ratio of inscribed circles having diameters of 60 μm or larger" in the honeycomb structure of Example 7.
Figure 17:
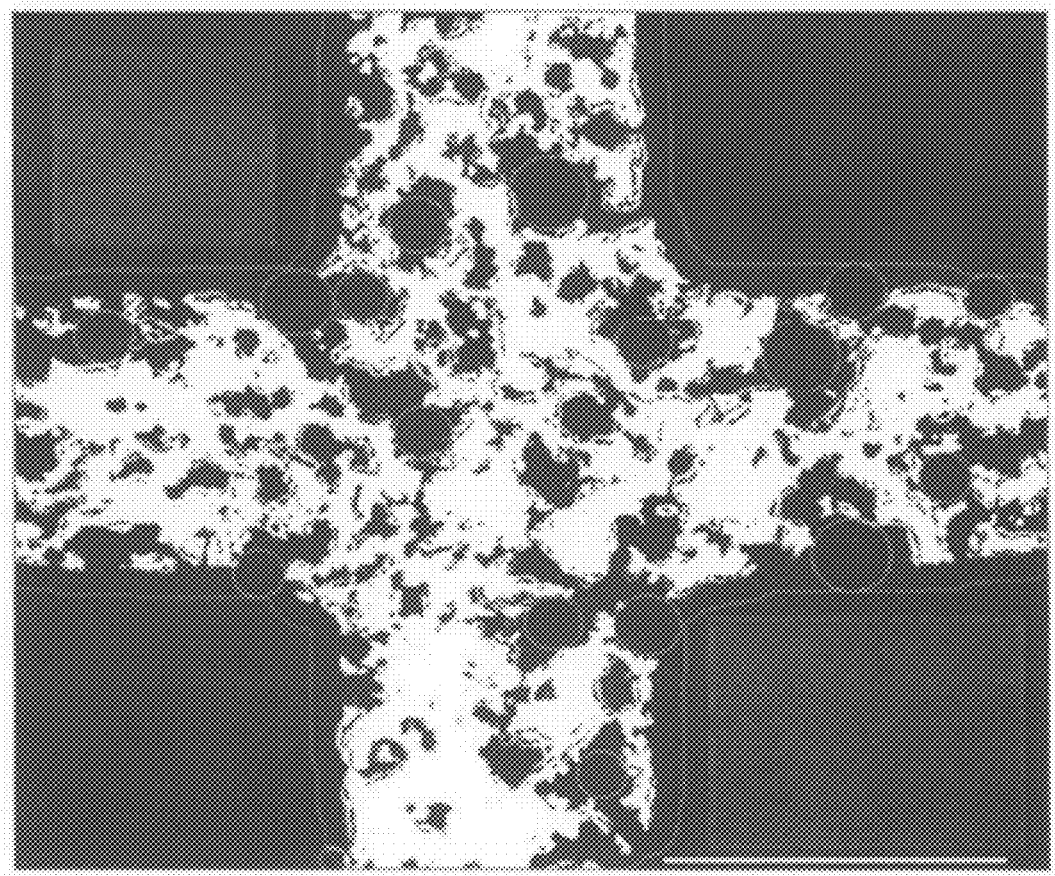
FIG. 17 is a micrograph which is used to measure "an area ratio of inscribed circles having diameters of 90 μm or larger" in a honeycomb structure of Comparative Example 1.

As to the honeycomb structures of Examples 2 to 24 and Comparative Examples 1 to 7, there were measured, in the same manner as in Example 1, "a volume ratio (%) of pores having pore diameters larger than a thickness of a partition wall", "an area ratio (%) of inscribed circles having diameters of 90 µm or larger", "an area ratio (%) of inscribed circles having diameters of 60 µm or larger", "a porosity (%)", "an average pore diameter (%)", "a thermal expansion coefficient (ppm/K)", "a catalyst charge ratio (%)", "a pressure drop ratio (–) with a catalyst", and "an isostatic strength (MPa)". Measurement results are shown in Table 2 and Table 4. Moreover, FIG. 15 shows a micrograph which was used in the measurement of "the area ratio of the inscribed circles having the diameters of 90 µm or larger" of the honeycomb structure of Example 7. FIG. 16 shows a micrograph which was used in the measurement of "the area ratio of the inscribed circles having the diameters of 60 µm or larger" of the honeycomb structure of Example 7. FIG. 17 shows a micrograph which was used in the measurement of "the area ratio of the inscribed circles having the diameters of 90 µm or larger" of the honeycomb structure of Comparative Example 1.

TABLE 1

| | Cordierite forming raw material | | | | | Water absorptive polymer | | Unexpanded resin balloon | | Binder | Surfactant | Water |
|---|---|---|---|---|---|---|---|---|---|---|---|---|
| | Talc (parts by mass) | Kaolin (parts by mass) | Calcined kaolin (parts by mass) | Alumina (parts by mass) | Aluminum hydroxide (parts by mass) | Average particle diameter | (parts by mass) | Average particle diameter | (parts by mass) | (parts by mass) | (parts by mass) | (parts by mass) |
| Example 1 | 40 | 15 | 28 | 12 | 5 | 125 µm | 1.0 | — | — | 5.6 | 0.5 | 50 |
| Example 2 | 40 | 15 | 28 | 12 | 5 | 150 µm | 1.0 | — | — | 5.6 | 0.5 | 50 |
| Example 3 | 40 | 15 | 28 | 12 | 5 | 175 µm | 1.0 | — | — | 5.6 | 0.5 | 50 |
| Example 4 | 40 | 15 | 28 | 12 | 5 | 200 µm | 1.0 | — | — | 5.6 | 0.5 | 50 |
| Example 5 | 40 | 15 | 28 | 12 | 5 | 250 µm | 1.0 | — | — | 5.6 | 0.5 | 50 |
| Example 6 | 40 | 15 | 28 | 12 | 5 | 125 µm | 2.0 | — | — | 5.6 | 0.5 | 60 |
| Example 7 | 40 | 15 | 28 | 12 | 5 | 150 µm | 2.0 | — | — | 5.6 | 0.5 | 60 |
| Example 8 | 40 | 15 | 28 | 12 | 5 | 200 µm | 2.0 | — | — | 5.6 | 0.5 | 60 |
| Example 9 | 40 | 15 | 28 | 12 | 5 | 125 µm | 3.0 | — | — | 5.6 | 0.5 | 70 |
| Example 10 | 40 | 15 | 28 | 12 | 5 | 150 µm | 3.0 | — | — | 5.6 | 0.5 | 70 |
| Example 11 | 40 | 15 | 28 | 12 | 5 | 200 µm | 3.0 | — | — | 5.6 | 0.5 | 70 |
| Example 12 | 40 | 15 | 28 | 12 | 5 | 125 µm | 4.0 | — | — | 5.6 | 0.5 | 80 |

TABLE 1-continued

| | Cordierite forming raw material | | | | | Water absorptive polymer | | Unexpanded resin balloon | | Binder | Surfactant | Water |
|---|---|---|---|---|---|---|---|---|---|---|---|---|
| | Talc (parts by mass) | Kaolin (parts by mass) | Calcined kaolin (parts by mass) | Alumina (parts by mass) | Aluminum hydroxide (parts by mass) | Average particle diameter | (parts by mass) | Average particle diameter | (parts by mass) | (parts by mass) | (parts by mass) | (parts by mass) |
| Example 13 | 40 | 15 | 28 | 12 | 5 | 150 μm | 4.0 | — | — | 5.6 | 0.5 | 80 |
| Example 14 | 40 | 15 | 28 | 12 | 5 | 200 μm | 4.0 | — | — | 5.6 | 0.5 | 80 |
| Example 15 | 40 | 15 | 28 | 12 | 5 | 125 μm | 6.0 | — | — | 5.6 | 0.5 | 120 |
| Example 16 | 40 | 15 | 28 | 12 | 5 | 150 μm | 6.0 | — | — | 5.6 | 0.5 | 120 |
| Example 17 | 40 | 15 | 28 | 12 | 5 | 200 μm | 6.0 | — | — | 5.6 | 0.5 | 120 |

TABLE 2

| | Volume ratio of pores having pore diameters larger than thickness of partition wall (%) | Area ratio of inscribed circles having diameters of 90 μm or larger (%) | Area ratio of inscribed circles having diameters of 60 μm or larger (%) | Porosity (%) | Average pore diameter (%) | Thermal expansion coefficient (ppm/K) | Catalyst charge ratio (%) | Pressure drop with catalyst (—) | Isostatic strength (MPa) |
|---|---|---|---|---|---|---|---|---|---|
| Example 1 | 4.0 | 10.0 | 2.0 | 40 | 10 | 0.34 | 75 | 0.91 | 3.9 |
| Example 2 | 4.1 | 15.4 | 2.1 | 42 | 12 | 0.36 | 74 | 0.88 | 3.7 |
| Example 3 | 4.2 | 21.4 | 2.4 | 41 | 14 | 0.41 | 78 | 0.87 | 3.8 |
| Example 4 | 4.1 | 17.6 | 2.3 | 40 | 15 | 0.32 | 76 | 0.89 | 3.9 |
| Example 5 | 4.1 | 23.7 | 2.7 | 40 | 17 | 0.33 | 75 | 0.88 | 3.7 |
| Example 6 | 4.5 | 38.3 | 3.7 | 51 | 20 | 0.38 | 76 | 0.90 | 3.9 |
| Example 7 | 4.7 | 45.3 | 4.4 | 48 | 22 | 0.40 | 83 | 0.80 | 2.1 |
| Example 8 | 4.7 | 41.2 | 4.4 | 50 | 23 | 0.34 | 80 | 0.82 | 2.3 |
| Example 9 | 4.9 | 47.1 | 4.7 | 56 | 26 | 0.35 | 84 | 0.79 | 2.0 |
| Example 10 | 5.1 | 39.0 | 4.9 | 53 | 29 | 0.33 | 86 | 0.76 | 2.2 |
| Example 11 | 5.3 | 41.7 | 5.3 | 54 | 32 | 0.39 | 85 | 0.77 | 2.1 |
| Example 12 | 5.4 | 37.0 | 5.6 | 60 | 37 | 0.40 | 88 | 0.74 | 1.8 |
| Example 13 | 5.7 | 38.1 | 5.8 | 59 | 41 | 0.49 | 88 | 0.74 | 1.7 |
| Example 14 | 6.4 | 43.1 | 6.5 | 60 | 45 | 0.42 | 87 | 0.73 | 1.7 |
| Example 15 | 6.9 | 48.8 | 7.3 | 63 | 49 | 0.37 | 92 | 0.70 | 1.3 |
| Example 16 | 7.3 | 47.3 | 8.4 | 64 | 52 | 0.31 | 91 | 0.69 | 1.4 |
| Example 17 | 8.9 | 43.1 | 9.5 | 66 | 58 | 0.41 | 90 | 0.67 | 1.2 |

TABLE 3

| | Cordierite forming raw material | | | | | Water absorptive polymer | | Unexpanded resin balloon | | Binder | Surfactant | Water |
|---|---|---|---|---|---|---|---|---|---|---|---|---|
| | Talc (parts by mass) | Kaolin (parts by mass) | Calcined kaolin (parts by mass) | Alumina (parts by mass) | Aluminum hydroxide (parts by mass) | Average particle diameter | (parts by mass) | Average particle diameter | (parts by mass) | (parts by mass) | (parts by mass) | (parts by mass) |
| Example 18 | 40 | 15 | 28 | 12 | 5 | 250 μm | 8.0 | — | — | 5.6 | 0.5 | 140 |
| Example 19 | 40 | 15 | 28 | 12 | 5 | — | — | 125 μm | 4.0 | 5.6 | 0.5 | 35 |
| Example 20 | 40 | 15 | 28 | 12 | 5 | — | — | 150 μm | 4.0 | 5.6 | 0.5 | 35 |
| Example 21 | 40 | 15 | 28 | 12 | 5 | — | — | 200 μm | 4.0 | 5.6 | 0.5 | 35 |
| Example 22 | 40 | 15 | 28 | 12 | 5 | — | — | 125 μm | 8.0 | 5.6 | 0.5 | 35 |
| Example 23 | 40 | 15 | 28 | 12 | 5 | — | — | 150 μm | 8.0 | 5.6 | 0.5 | 35 |
| Example 24 | 40 | 15 | 28 | 12 | 5 | — | — | 200 μm | 8.0 | 5.6 | 0.5 | 35 |
| Comparative Example 1 | 40 | 15 | 28 | 12 | 5 | 20 μm | 2.0 | — | — | 5.6 | 0.5 | 40 |
| Comparative Example 2 | 40 | 15 | 28 | 12 | 5 | 75 μm | 2.0 | — | — | 5.6 | 0.5 | 60 |
| Comparative Example 3 | 40 | 15 | 28 | 12 | 5 | 100 μm | 2.0 | — | — | 5.6 | 0.5 | 60 |
| Comparative Example 4 | 40 | 15 | 28 | 12 | 5 | 75 μm | 6.0 | — | — | 5.6 | 0.5 | 120 |
| Comparative Example 5 | 40 | 15 | 28 | 12 | 5 | 100 μm | 6.0 | — | — | 5.6 | 0.5 | 120 |
| Comparative Example 6 | 40 | 15 | 28 | 12 | 5 | 250 μm | 0.5 | — | — | 5.6 | 0.5 | 45 |
| Comparative Example 7 | 40 | 15 | 28 | 12 | 5 | 150 μm | 9.0 | — | — | 5.6 | 0.5 | 140 |

TABLE 4

|  | Volume ratio of pores having pore diameters larger than thickness of partition wall (%) | Area ratio of inscribed circles having diameters of 90 μm or larger (%) | Area ratio of inscribed circles having diameters of 60 μm or larger (%) | Porosity (%) | Average pore diameter (%) | Thermal expansion coefficient (ppm/K) | Catalyst charge ratio (%) | Pressure drop with catalyst (—) | Isostatic strength (MPa) |
|---|---|---|---|---|---|---|---|---|---|
| Example 18 | 10.0 | 50.0 | 10.0 | 70 | 60 | 0.37 | 93 | 0.65 | 1.1 |
| Example 19 | 4.1 | 10.7 | 2.3 | 42 | 13 | 0.34 | 70 | 0.91 | 3.8 |
| Example 20 | 5.2 | 13.2 | 3.1 | 41 | 24 | 0.39 | 73 | 0.85 | 3.8 |
| Example 21 | 4.8 | 15.4 | 2.8 | 48 | 28 | 0.41 | 74 | 0.84 | 3.7 |
| Example 22 | 4.7 | 45.7 | 7.4 | 64 | 50 | 0.35 | 81 | 0.74 | 1.5 |
| Example 23 | 7.1 | 48.5 | 8.5 | 68 | 58 | 0.33 | 86 | 0.71 | 1.4 |
| Example 24 | 9.7 | 49.1 | 9.2 | 68 | 59 | 0.30 | 86 | 0.69 | 1.3 |
| Comparative Example 1 | 1.7 | 0.0 | 0.0 | 53 | 14 | 0.34 | 60 | 1.00 | 2.0 |
| Comparative Example 2 | 1.5 | 0.0 | 0.0 | 52 | 14 | 0.47 | 63 | 0.98 | 2.1 |
| Comparative Example 3 | 2.1 | 3.6 | 0.0 | 53 | 19 | 0.46 | 66 | 0.94 | 1.8 |
| Comparative Example 4 | 2.3 | 0.0 | 0.0 | 65 | 24 | 0.32 | 69 | 0.92 | 1.2 |
| Comparative Example 5 | 2.9 | 4.4 | 0.6 | 63 | 32 | 0.31 | 68 | 0.94 | 1.3 |
| Comparative Example 6 | 3.8 | 8.9 | 1.8 | 36 | 8 | 0.43 | 59 | 1.10 | 4.2 |
| Comparative Example 7 | 11.4 | 51.1 | 11.2 | 72 | 64 | 0.37 | 92 | 0.64 | 0.7 |

As shown in Table 2 and Table 4, the honeycomb structures of Examples 1 to 24 have a small pressure drop ratio (−). Moreover, the honeycomb structures have a high isostatic strength as compared with the honeycomb structures of the comparative examples having about the same pressure drop ratio (−). In the honeycomb structure of Comparative Example 7, all of "the volume ratio (%) of the pores having pore diameters larger than the thickness of the partition wall", "the area ratio (%) of the inscribed circles having the diameters of 90 μm or larger" and "the area ratio (%) of the inscribed circles having the diameters of 60 μm or larger" are excessively large. Therefore, a large amount of catalyst can be carried onto the honeycomb structure, but the isostatic strength thereof is remarkably low.

A honeycomb structure of the present invention can be utilized as a catalyst carrier onto which a catalyst is carried. Moreover, a manufacturing method of a honeycomb structure of the present invention can suitably be utilized in the manufacturing of such a honeycomb structure.

DESCRIPTION OF REFERENCE NUMERALS

1, 21 and 41: partition wall, 2, 22 and 42: cell, 3, 23 and 43: outer peripheral wall, 6, 26 and 46: pore, 6a, 26a and 46a: pore (a pore having a pore diameter larger than a thickness of a partition wall), 27a, 27b, 47, 47a and 47b: inscribed circle, 100, 120 and 140: honeycomb structure, 200: catalyst carrying honeycomb structure, and 210: catalyst.

What is claimed is:

1. A honeycomb structure comprising porous partition walls by which a plurality of cells that define through channels of a fluid are partitioned and in which a plurality of pores are formed, wherein respective ends of each of the plurality of cells are open;
   wherein in sections of the partition walls cut perpendicular with respect to an extending direction of the cells, a ratio of the sum of areas of inscribed circles having diameters of 90 μm or larger among inscribed circles drawn in the pores in the sections, with respect to the total area of all the pores in the sections, is from 10 to 50%, and wherein in each of the partition walls, pores having pore diameters larger than a thickness of the partition wall, in a section thereof which is perpendicular to an extending direction of the cells, are formed to occupy 4 to 11% of the total volume of the pores formed in the partition wall.

2. The honeycomb structure according to claim 1, wherein the partition walls are made of a ceramic containing material, and the partition walls have a porosity of 40 to 70% and an average pore diameter of 10 to 70 μm.

3. The honeycomb structure according to claim 1, wherein the partition walls are made of a material containing at least one type of ceramic selected from the group consisting of cordierite, silicon carbide, aluminum titanate, and mullite.

4. The honeycomb structure according to claim 1, wherein the partition walls have a thickness of 50 to 350 μm, and a cell density of 15.5 to 155 cells/cm$^2$.

5. A catalyst carrying honeycomb structure comprising the honeycomb structure according to claim 1, and a catalyst charged into the pores of the partition walls of the honeycomb structure,
   wherein a ratio of volumes of the pores into which the catalyst has been charged, with respect to the total volume of the pores of the partition walls, is from 70 to 100%.

6. A honeycomb structure comprising porous partition walls by which a plurality of cells that define through channels of a fluid are partitioned and in which a plurality of pores are formed, wherein respective ends of each of the plurality of cells are open;
   wherein in a surface of each of the partition walls, a ratio of the sum of areas of inscribed circles having diameters of 60 μm or larger among inscribed circles drawn in open frontal areas of pores opened in the surface of the partition wall, with respect to an area of the surface of the partition wall, is from 2 to 10%, and wherein in each of the partition walls, pores having pore diameters larger than a thickness of the partition wall, in a section thereof which is perpendicular to an extending direction of the cells, are formed to occupy 4 to 11% of the total volume of the pores formed in the partition wall.

7. The honeycomb structure according to claim 6, wherein the partition walls are made of a ceramic containing material, and the partition walls have a porosity of 40 to 70% and an average pore diameter of 10 to 70 μm.

8. The honeycomb structure according to claim 6, wherein the partition walls are made of a material containing at least one type of ceramic selected from the group consisting of cordierite, silicon carbide, aluminum titanate, and mullite.

9. The honeycomb structure according to claim 6, wherein the partition walls have a thickness of 50 to 350 μm, and a cell density of 15.5 to 155 cells/cm$^2$.

10. A catalyst carrying honeycomb structure comprising the honeycomb structure according to claim 6, and a catalyst charged into the pores of the partition walls of the honeycomb structure, wherein a ratio of volumes of the pores into which the catalyst has been charged, with respect to the total volume of the pores of the partition walls, is from 70 to 100%.

* * * * *